United States Patent
Tajiri

(10) Patent No.: US 10,444,605 B2
(45) Date of Patent: *Oct. 15, 2019

(54) LIGHT SOURCE DEVICE AND PROJECTOR

(71) Applicant: SONY CORPORATION, Tokyo (JP)

(72) Inventor: Shinichiro Tajiri, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/057,545

(22) Filed: Aug. 7, 2018

(65) Prior Publication Data

US 2018/0373130 A1  Dec. 27, 2018

Related U.S. Application Data

(63) Continuation of application No. 15/520,071, filed as application No. PCT/JP2015/077817 on Sep. 30, 2015, now Pat. No. 10,067,413.

(30) Foreign Application Priority Data

Oct. 28, 2014 (JP) .................................. 2014-219313

(51) Int. Cl.
  *G03B 21/20* (2006.01)
  *H04N 9/31* (2006.01)
  (Continued)

(52) U.S. Cl.
  CPC ............... *G03B 21/14* (2013.01); *F21S 2/00* (2013.01); *F21V 7/09* (2013.01); *F21V 9/30* (2018.02);
  (Continued)

(58) Field of Classification Search
  CPC .............. G03B 21/204; G03B 21/2013; G03B 21/2033; G03B 21/2066; G03B 21/208;
  (Continued)

(56) References Cited

U.S. PATENT DOCUMENTS 10,067,413 B2 * 9/2018 Tajiri ........................ F21S 2/00
2011/0310362 A1  12/2011 Komatsu
(Continued)

FOREIGN PATENT DOCUMENTS

CN  103201678 A  7/2013
CN  103430093 A  12/2013
(Continued)

OTHER PUBLICATIONS

International Preliminary Report on Patentability of PCT Application No. PCT/JP2015/077817, dated May 11, 2017, 11 pages of English Translation and 06 pages of IPRP.
(Continued)

*Primary Examiner* — Ryan D Howard
(74) *Attorney, Agent, or Firm* — Chip Law Group

(57) ABSTRACT

Provided is a light source device including: at least one light source unit (110) that emits substantially parallel light in a predetermined wavelength band; and a light guide unit (120, 130) that guides the light from the light source unit (110) toward a light collection spot (143). The light from the light source unit (110) is sequentially reflected by a concave mirror (121) and a convex mirror (122) and is guided toward the light collection spot (143) in the light guide unit (120, 130).

15 Claims, 19 Drawing Sheets

(51) Int. Cl.
  *G03B 21/14* (2006.01)
  *F21V 9/30* (2018.01)
  *F21S 2/00* (2016.01)
  *F21V 7/09* (2006.01)
  *F21V 14/04* (2006.01)
  *H04N 5/74* (2006.01)

(52) U.S. Cl.
  CPC ............ *F21V 14/04* (2013.01); *G03B 21/204* (2013.01); *G03B 21/208* (2013.01); *G03B 21/2066* (2013.01); *H04N 5/74* (2013.01); *H04N 9/3152* (2013.01); *H04N 9/3158* (2013.01)

(58) Field of Classification Search
  CPC .. H04N 9/3152; H04N 9/3155; H04N 9/3161; H04N 9/3164
  USPC .................................................. 362/298, 346
  See application file for complete search history.

(56) References Cited

U.S. PATENT DOCUMENTS

| | | |
|---|---|---|
| 2011/0310363 A1 | 12/2011 | Kita |
| 2013/0215397 A1 | 8/2013 | Matsubara |
| 2013/0258689 A1 | 10/2013 | Takahira et al. |
| 2013/0321777 A1 | 12/2013 | Wang et al. |
| 2015/0177607 A1 | 6/2015 | Matsubara |

FOREIGN PATENT DOCUMENTS

| | | |
|---|---|---|
| EP | 2687903 A1 | 1/2014 |
| JP | 2002-270005 A | 9/2002 |
| JP | 2002-365488 A | 12/2002 |
| JP | 3102988 U | 7/2004 |
| JP | 2010-085740 A | 4/2010 |
| JP | 2014-017094 A | 1/2014 |
| JP | 2014-082144 A | 5/2014 |
| WO | 2012/063322 A1 | 5/2012 |
| WO | 2012/127554 A1 | 9/2012 |

OTHER PUBLICATIONS

International Search Report and Written Opinion of PCT Application No. PCT/JP2015/077817, dated Dec. 15, 2015, 10 pages of English Translation and 10 pages of ISRWO.

Notice of Allowance and Fees Due for U.S. Appl. No. 15/520,071, dated May 10, 2018, 07 pages.

Non-Final Rejection for U.S. Appl. No. 15/520,071, dated Nov. 17, 2017, 14 pages.

* cited by examiner

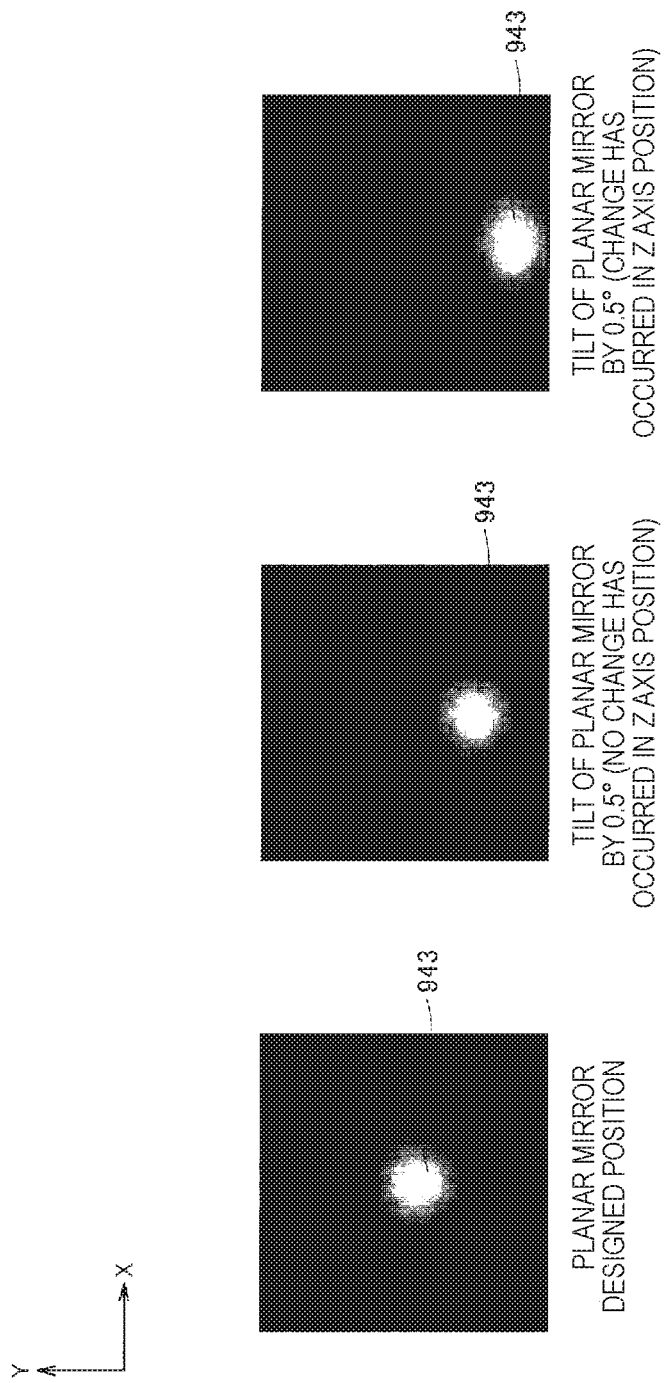

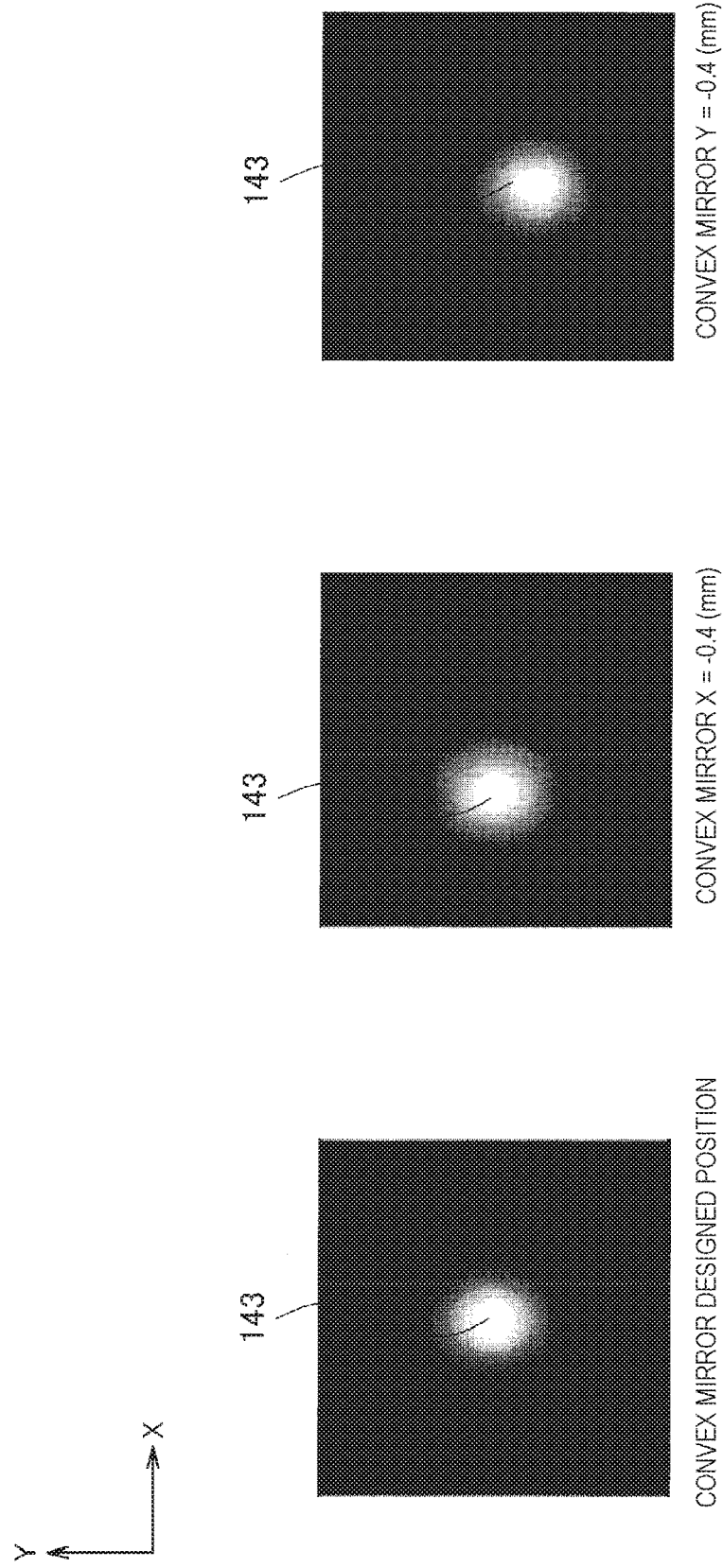

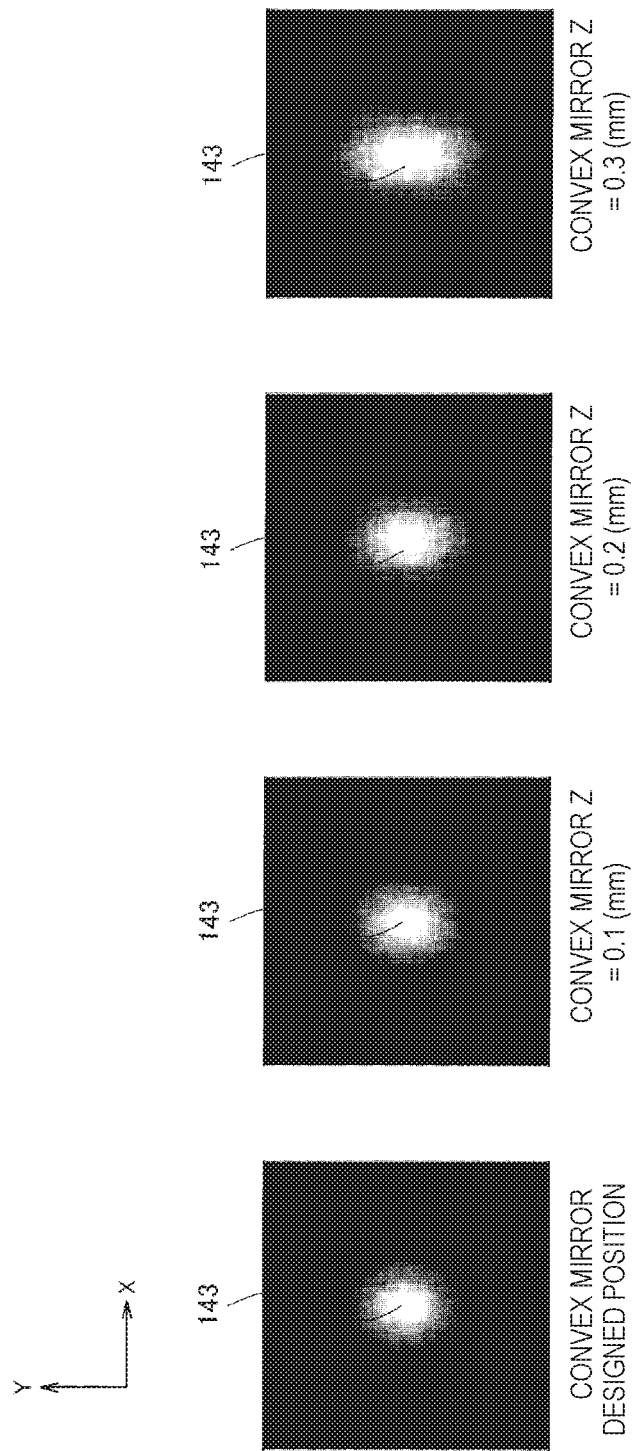

FIG. 9
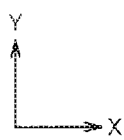
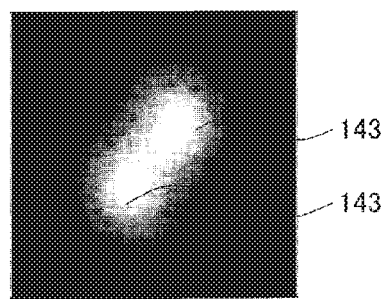

LIGHT SOURCE DEVICE AND PROJECTOR

CROSS-REFERENCE TO RELATED APPLICATIONS

The present application is a continuation application of U.S. patent application Ser. No. 15/520,071, filed Apr. 18, 2017, which is a National Stage of PCT/JP2015/077817 filed on Sep. 30, 2015, and claims the benefit of priority from prior Japanese Patent Application No. JP 2014-219313 filed in the Japan Patent Office on Oct. 28, 2014. Each of the above-referenced applications is hereby incorporated herein by reference in its entirety.

TECHNICAL FIELD

The present disclosure relates to a light source device and a projector.

BACKGROUND ART

In recent years, projectors using solid-state light sources such as light emitting diodes (LEDs) or laser diodes (LDs) as light sources have become widespread. Some light sources for the projectors use the solid-state light sources such as LDs as direct light sources while others use light from the solid-state light sources as excitation light and use fluorescent substances emitting fluorescent light due to irradiation with the excitation light as light sources.

Thus, various technologies for efficiently irradiating the fluorescent substances with the light from solid-state light sources have been developed. For example, Patent Literature 1 discloses a light source device that reflects light from a solid-state light source by a concave mirror and collects the light on a fluorescent substance.

CITATION LIST

Patent Literature

Patent Literature 1: JP 2014-82144A

DISCLOSURE OF INVENTION

Technical Problem

Here, an operation of adjusting a position and a size of a light collection spot on a fluorescent substance may occur in assembling a light source device, for example. In the adjusting operation, arrangement positions of a solid-state light source and other optical members, for example, are finely adjusted.

Although the light collection spot can be adjusted by changing the arrangement positions of the optical members also in the technology described in Patent Literature 1, it is difficult to state that the adjustment of the light collection spot can be easily performed since both the position and the size of the light collection spot change in conjunction with the change of the positions of the optical members due to the configuration of the technology. It is also difficult to respectively adjust the position and the size of the light collection spot with high precision. There is a concern that the quality of light output from the light source device may be degraded unless the position and the size of the light collection spot can be controlled with high precision.

Thus, the present disclosure proposes a novel improved light source device and a projector capable of obtaining output light with higher quality.

Solution to Problem

According to the present disclosure, there is provided a light source device including: at least one light source unit that emits substantially parallel light in a predetermined wavelength band; and a light guide unit that guides the light from the light source unit toward a light collection spot, in which the light from the light source unit is sequentially reflected by a concave mirror and a convex mirror and is guided toward the light collection unit in the light guide unit.

According to the present disclosure, there is provided a projector including: a light source device including at least one light source that emits substantially parallel light in a predetermined wavelength band and a light guide unit that guides the light from the light source unit toward a light collection unit; and an image projection device that generates an image by using the light output from the light source device and projects the image, in which the light from the light source unit is sequentially reflected by a concave mirror and a convex mirror and is guided toward the light collection spot in the light guide unit of the light source device.

According to the present disclosure, the light from the light source unit is sequentially reflected by the concave mirror and the convex mirror and is guided toward the light collection spot. With such a configuration, it is possible to respectively independently adjust the respective positions in two mutually different directions in a plane perpendicular to the light reflected by the convex mirror and the size of the light collection spot by adjusting positions of the convex mirror in three axis directions. Therefore, it is possible to more easily and more precisely adjust the position and the size of the light collection spot. Accordingly, it is possible to further improve a quality of the light output from the light source device, which can depend on the position and the size of the light collection spot, by appropriately adjusting the position and the size of the light collection spot.

Advantageous Effects of Invention

According to the present disclosure, it is possible to obtain output light with higher quality as described above. Note that the effects described above are not necessarily limitative. With or in the place of the above effects, there may be achieved any one of the effects described in this specification or other effects that may be grasped from this specification.

BRIEF DESCRIPTION OF DRAWINGS

FIGS. 4A, 4B and 4C are diagrams illustrating a change in a light collection spot when an angle of the planar mirror with respect to a Z axis direction is changed in the typical light source device.

FIGS. 5A, 5B and 5C are diagrams illustrating a change in the light collection spot when a convex mirror is moved in an X axis direction and a Y axis direction in the light source device according to the first embodiment.

FIGS. 6A, 6B, 6C and 6D are diagrams illustrating a change in the light collection spot when the convex mirror is moved in the Z axis direction in the light source device according to the first embodiment.

FIG. 9 is a diagram illustrating a formation example of a light collection spot in the light source device according to the third embodiment.

MODES FOR CARRYING OUT THE INVENTION

Figure 1:
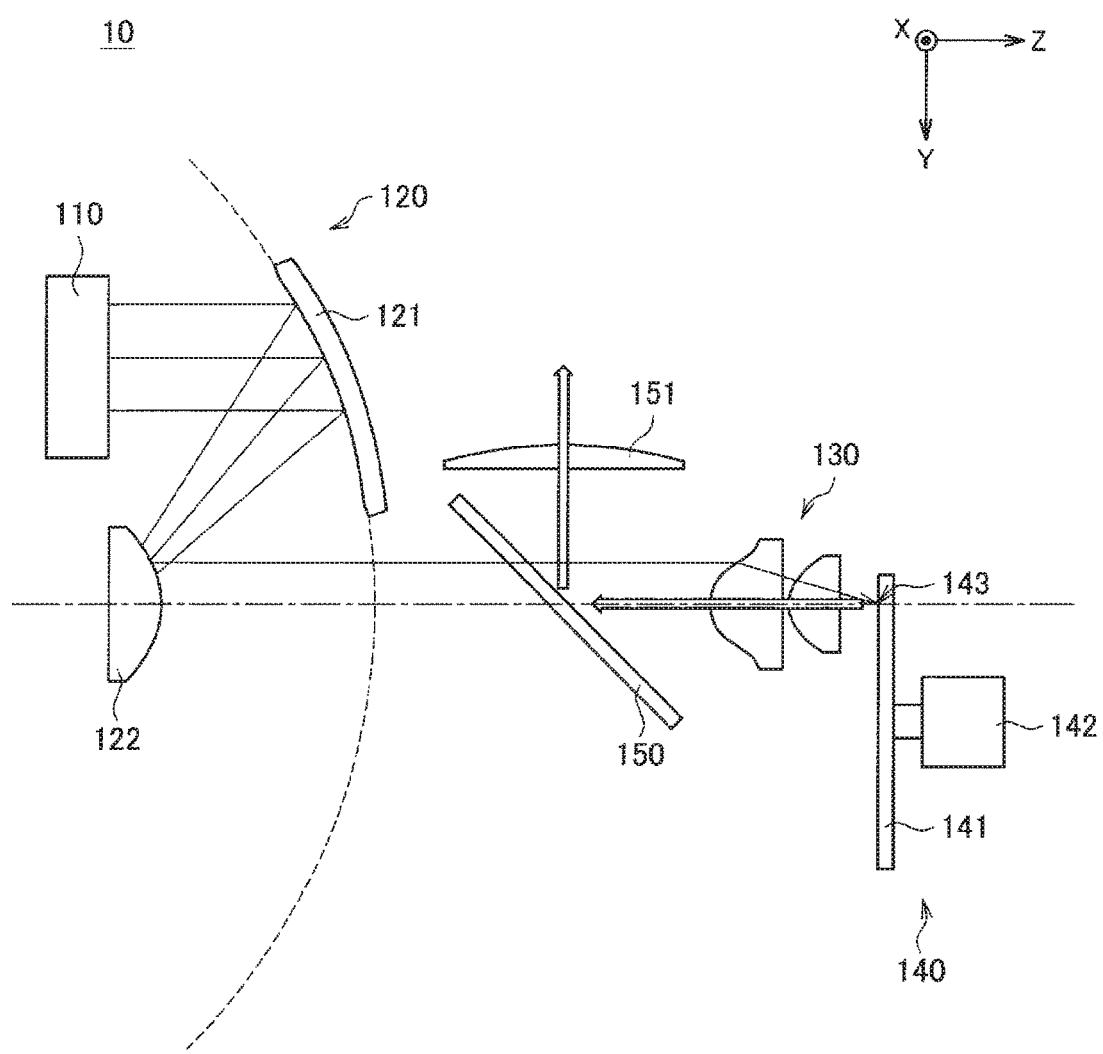
FIG. 1 is a diagram illustrating a configuration example of a light source device according to a first embodiment.

Hereinafter, (a) preferred embodiment(s) of the present disclosure will be described in detail with reference to the appended drawings. In this specification and the appended drawings, structural elements that have substantially the same function and structure are denoted with the same reference numerals, and repeated explanation of these structural elements is omitted.

Now, description will be given in the following order.
1. First Embodiment
1-1. Configuration of light source device
1-2. Comparison with typical light source device
1-2-1. Comparison of device configurations
1-2-2. Comparison of methods for adjusting light collection spot
2. Second Embodiment
3. Third Embodiment
4. Fourth Embodiment
5. Fifth Embodiment
6. Sixth Embodiment
7. Application examples
7-1. First configuration example
7-2. Second configuration example
7-3. Third configuration example
7-4. Fourth configuration example
7-5. Summary of application examples
8. Supplementary notes

1. First Embodiment (1-1. Configuration of Light Source Device)

With reference to FIG. 1, a configuration of a light source device according to a first embodiment of the present disclosure will be described. FIG. 1 is a diagram illustrating a configuration example of the light source device according to the first embodiment.

Referring to FIG. 1, a light source device 10 according to the first embodiment mainly includes a light source unit 110, a light guide unit 120, a light collection unit 130, a fluorescent substance wheel 140, and a spectroscopy unit 150. The light source device 10 according to the first embodiment is a light source device that outputs at least fluorescent light emitted from a fluorescent substance by irradiating the fluorescent substance of the fluorescent substance wheel 140 with light from the light source unit 110.

The light source unit 110 emits substantially parallel light in a predetermined wavelength band. The light source unit 110 includes at least one LD that is a solid-state light source and at least one collimator lens that substantially parallelizes the light emitted from the LD. In the first embodiment, the light source unit 110 is configured such that a plurality of combinations, each of which includes the LD and the collimator lens, for example, are aligned in a predetermined direction. In FIG. 1, light from the plurality of LDs is represented by a single representative solid line.

In the first embodiment, LDs that emit laser light in a blue band (a wavelength band from about 400 (nm) to 500 (nm)) are used as the light source unit 110. However, the first embodiment is not limited to such an example. As will be described later, the light from the light source unit 110 is used as excitation light for causing the fluorescent substance of the fluorescent substance wheel 140 to emit light. Therefore, performances of the LDs that form the light source unit 110 may be appropriately selected in accordance with desired properties of the fluorescent light, that is, in accordance with properties of the fluorescent substance used.

In the following description, a direction in which the light source unit 110 emits light will be defined as a Z axis direction. Also, two directions that perpendicularly intersect each other in a plane perpendicular to the Z axis direction will be defined as an X axis direction and a Y axis direction. In the example illustrated in FIG. 1, the LDs that form the light source unit 110 are aligned in one arrays or a plurality of arrays in the Y axis direction.

The light guide unit 120 guides the light from the light source unit 110 toward the fluorescent substance wheel 140. The light guide unit 120 includes a concave mirror 121 and a convex mirror 122. As shown in the drawing, the light from the light source unit 110 is reflected by the concave mirror 121 and the convex mirror 122 in this order and is then guided toward the fluorescent substance wheel 140.

The concave mirror 121 is a plate-like member with a substantially rectangular shape and is arranged such that a reflecting surface thereof faces the light source unit 110. The concave mirror 121 is formed such that the reflective surface thereof has a paraboloidal surface and reflects the light from the light source unit 110 toward the convex mirror 122. Since the reflective surface of the concave mirror 121 is the paraboloidal surface, the light from the plurality of LDs in the light source unit 110 can be more effectively collected at the convex mirror 122. Use of the concave mirror 121 can realize a function of collecting light at a predetermined position (on the reflective surface of the convex mirror 122 in the first embodiment) with a smaller configuration than that in a case where other optical members such as a lens group or a planar mirror are used.

However, the shape of the concave mirror 121 is not limited to such an example. The shape and the properties of the concave mirror 121 can appropriately be set in consideration of arrangement positions of the LDs that form the light source unit 110, the size and the incident angle of a light flux that is incident on the concave mirror 121, and the position and the size of the light collection spot 143 on the fluorescent substance wheel 140, which will be described later, for example.

For example, the reflective surface of the concave mirror 121 may be a spherical surface or another free curved surface. Also, the shape of the concave mirror 121 is not limited to a substantially rectangular shape, and the concave mirror 121 may be formed into a bowl shape, for example, so as to cover the light source unit 110. However, forming the concave mirror 121 into a substantially rectangular shape as illustrated in the drawing makes it possible to further downsize the configuration of the concave mirror 121 and to downsize the entire light source device 10 as well.

The convex mirror 122 has a substantially semi-spherical shape and is arranged at a position corresponding to the light collection point by the concave mirror 121 such that the reflective surface thereof faces in a positive direction of the Z axis direction. The convex mirror 122 is a spherical mirror in which the reflective surface is a spherical surface. The light from the light source unit 110, which has been reflected by the concave mirror 121 and has been incident on the convex mirror 122, is further reflected by the convex mirror 122 and is guided toward the fluorescent substance wheel 140 arranged in the positive direction of the Z axis. In FIG. 1, the light after being reflected by the convex mirror 122 of the light guide unit 120 is represented by a single representative solid line for simplification.

The shape of the convex mirror 122 is not limited to the aforementioned example. The shape and the properties of the convex mirror 122 can appropriately be set in consideration of a positional relationship with the concave mirror 121, the size and the incident angle of a light flux that is incident on the convex mirror 122, and the position and the size of the light collection spot 143 on the fluorescent substance wheel 140, which will be described later, for example. For example, the reflective surface of the convex mirror 122 may be an aspherical surface. For example, the convex mirror 122 may not be a substantially semi-spherical shape.

However, at least one of the reflective surfaces of the concave mirror 121 and the convex mirror 122 is preferably an aspherical surface. By employing an aspherical shape for at least one of the reflective surfaces of the concave mirror 121 and the convex mirror 122, it is possible to reduce aberration of the light that is incident on the fluorescent substance wheel 140 and to improve efficiency in collecting the light at the fluorescent substance wheel 140. At this time, it is preferable that the reflective surface of the concave mirror 121 is an aspherical surface while the reflective surface of the convex mirror 122 is a spherical shape. In this case, it is possible to use a commercially available spherical mirror as the convex mirror 122 and to thereby reduce manufacturing costs.

Here, the arrangement positions are adjusted such that an optical axis of the concave mirror 121 and an optical axis of the convex mirror 122 (for example, a central axis of a paraboloidal surface that forms the reflective surface of the concave mirror 121 and a central axis of a spherical surface that forms the reflective surface of the convex mirror) substantially coincide with each other in the first embodiment. In this manner, the light reflected by the convex mirror 122 becomes substantially parallel light and is then guided toward the fluorescent substance wheel 140.

The light source device 10 can be provided with an adjustment mechanism for adjusting positions of the convex mirrors 122 in the three axis directions (the X axis direction, the Y axis direction, and the Z axis direction). The adjustment mechanism has a function of moving the convex mirror 122 in parallel to the three axis directions, respectively.

The adjustment mechanism adjusts a positional relationship between both the central axes such that they substantially coincide with each other if the central axes deviate from each other due to an error caused when the concave mirror 121 and the convex mirror 122 are assembled, for example. Also, it is possible to adjust the position and the size of the light collection spot 143 on the fluorescent substance wheel 140, which will be described later, by adjusting the positions of the convex mirror 122 in the three axis directions in the light source device 10 as will be described later. That is, the adjustment mechanism can also adjust the light collection spot 143.

As a specific configuration of the adjustment mechanism, various known configurations that can be typically used for moving members in parallel can be used. For example, the adjustment mechanism may be formed of an actuator that is made of a drive device for a motor, for example, and may electrically move the positions of the convex mirror 122. Alternatively, the adjustment mechanism may be formed of a combination of transmission members such as a gear, for example, and may manually cause mechanical movement of the positions of the convex mirror 122.

The fluorescent substance wheel 140 includes a disk-shape substrate 141 and a fluorescent substance (not illustrated) provided on the substrate 141. The fluorescent substance wheel 140 is arranged such that a surface, on which the fluorescent substance is provided, of the substrate 141 faces the light guide unit 120 (that is, so as to face the negative direction of the Z axis). A motor 142 that drives the fluorescent substance wheel 140 is connected to the center of the substrate 141, and the fluorescent substance wheel 140 can rotate about a normal line passing through the center of the substrate 141 as a rotation axis.

The fluorescent substance provided at the fluorescent substance wheel 140 functions as a light emitting substance that is excited with light from the light source unit 110 and emits fluorescent light in a longer wavelength band than the wavelength of the light. In the first embodiment, the fluorescent substance is a YAG (yttrium/aluminum/garnet)-based fluorescent substance, is excited with the light in a blue band from the light source unit 110, and emits light from a green band to a red band. The fluorescent substance wheel 140 according to the first embodiment is a reflective-type fluorescent substance wheel, and the light from the fluorescent substance is radiated in the incident direction of the light from the light source unit 11 (that is, the negative direction of the Z axis). However, the first embodiment is not limited to such an example, and various known fluorescent substances may be used as the fluorescent substance of the fluorescent substance wheel 140 so as to be able to obtain light in a desired wavelength band in accordance with a purpose of the light source device 10, for example.

The light collection unit 130 that collects the substantially parallel light which has been guided by the light guide unit 120 on the fluorescent substance of the fluorescent substance wheel 140 is provided between the light guide unit 120 and the fluorescent substance wheel 140. The light collection unit 130 is arranged such that an optical axis thereof substantially coincides with the optical axes of the concave mirror 121 and the convex mirror 122. The light collection unit 130 collects the light on the light collection spot 143 on the fluorescent substance, and the light collection spot 143 emits the fluorescent light. The light guide unit 120 and the light collection unit 130 can be referred to as an optical system that collects the light from the light source unit 110 at the light collection spot 143. Therefore, the light guide unit 120 (the concave mirror 121 and the convex mirror 122) and the light collection unit 130 will be collectively referred to as a light collection optical system in some cases in the following description.

In the illustrated example, the light collection unit 130 includes a plurality of convex lenses. However, the first embodiment is not limited to such an example. The configuration of the light collection unit 130 and properties of the optical members that form the light collection unit 130 may appropriately be designed in consideration of a positional relationship between the light guide unit 120 and the fluorescent substance wheel 140, characteristics of the light from the light source unit 110, which serves as the excitation light, and characteristics of the fluorescent light emitted from the fluorescent substance of the fluorescent substance wheel 140, for example.

There is a possibility that if a specific position on the fluorescent substance is continuously irradiated with the light from the light source unit 110, light emitting properties of the fluorescent substance may be degraded due to heat caused by the irradiation with the light, for example. Since the relative position of the light collection spot 143 on the fluorescent substance wheel 140 may be constantly changed by irradiating the fluorescent substance wheel 140 with the light while rotating the fluorescent substance wheel 140, such degradation in the performance of the fluorescent substance can be avoided.

The fluorescent light emitted from the fluorescent substance of the fluorescent substance wheel 140 is isotropically radiated from the light collection spot 143. The fluorescent light is collected by the light collection unit 130, is guided in the incident direction of the excitation light (that is, the negative direction of the Z axis), becomes substantially parallel light, ad is incident on the spectroscopy unit 150 provided between the light guide unit 120 and the light collection unit 130. In FIG. 1, the fluorescent light emitted from the fluorescent substance of the fluorescent substance wheel 140 is represented by a wide arrow while the light from the light source unit 110 is represented by a solid line arrow for convenience of illustration.

As described above, the light collection unit 130 has a function of collecting the light, which has been guided by the light guide unit 120, at the light collection spot 143 and also has a function of collecting the fluorescent light, which has been emitted from the fluorescent substance of the fluorescent substance wheel 140 in the light collection unit 130. Therefore, such an optical design of the light collection unit 130 in which the light collection unit 130 suitably realizes these two functions is employed.

The light collection unit 130 is preferably arranged at a position as close to the fluorescent substance wheel 140 as possible. By arranging the light collection unit 130 at a position close to the fluorescent substance wheel 140, it is possible to more efficiently collect the fluorescent light emitted from the fluorescent substance of the fluorescent substance wheel 140 and to improve usage efficiency of the fluorescent light.

The spectroscopy unit 150 is provided on an optical path of light that is directed from the light guide unit 120 toward the fluorescent substance wheel 140. The spectroscopy unit 150 is formed of a dichroic mirror that has a capability of transmitting light in the wavelength band corresponding to the light from the light source unit 110 and reflecting light in the wavelength band corresponding to the fluorescent light emitted from the fluorescent substance of the fluorescent substance wheel 140, for example. However, the first embodiment is not limited to such an example, and the spectroscopy unit 150 can be formed of an arbitrary optical member that has a function of separating the light from the light source unit 110 and the fluorescent light from the fluorescent substance wheel 140.

As shown in the drawing, the light source device 10 is configured such that the light guide unit 120, the spectroscopy unit 150, the light collection unit 130, and the fluorescent substance wheel 140 are aligned substantially in one array in the Z axis direction in this order. The light from the light source unit 110 is guided in the positive direction of the Z axis by the light guide unit 120, is then transmitted through the spectroscopy unit 150, and is collected at the light collection spot 143 on the fluorescent substance of the fluorescent substance wheel 140 by the light collection unit 130. The fluorescent light emitted from the fluorescent substance of the fluorescent substance wheel 140 is guided in the negative direction of the Z axis by the light collection unit 130 and is then reflected by the spectroscopy unit 150.

In the illustrated example, the dichroic mirror forming the spectroscopy unit 150 is arranged at an angle of about 45° with respect to a direction in which the fluorescent light is emitted from the fluorescent substance wheel 140 (that is, with respect to the Z axis direction), and the fluorescent light is guided toward the Y axis direction by the dichroic mirror. The fluorescent light guided toward the Y axis direction is extracted outward as light output from the light source device 10 via an output lens 151.

The configuration of the light source device according to the first embodiment has been described above with reference to FIG. 1. The configuration example illustrated in FIG. 1 simply schematically shows the configuration of the light source device according to the first embodiment. The light source device 10 may further include various optical members, which are not illustrated, in the configuration illustrated in FIG. 1. For example, a diffuser plate may be provided at a stage previous to the incidence of the light from the light source unit 110 on the fluorescent substance wheel 140. By providing the diffuser plate, laser light from the plurality of LDs of the light source unit 110 is appropriately diffused, and the light collection spot 143 can be formed as a region with a predetermined size. Various other optical members that can be mounted on a typical light source device can further be mounted on the light source device 10.

Optical design of the various optical members, such as the concave mirror 121 and the convex mirror 122, that are mounted on the light source device 10 can be appropriately performed by using simulation such as light beam tracking. For example, a desired position and a size of the light collection spot 143 can be set in accordance with desired properties of the fluorescent light and light emitting properties of the fluorescent substance of the fluorescent substance wheel 140, for example. The optical design of the respective optical members may be performed by creating a calculation model in which the various optical members are arranged in the same manner as in the light source device 10 and repeatedly executing simulation while changing shapes, arrangement positions, optical properties, and the like of the respective optical members so as to realize the desired position and size of the light collection spot 143.

Here, although the respective optical members of the light source device 10 are designed so as to realize the desired position and size of the light collection spot 143 as described above, the position and the size of the light collection spot 143 may deviate from designed values in practice due to variations in manufacturing the respective optical members and positional deviations during assembly, for example. If the position and the size of the light collection spot 143 greatly deviate from the designed values, there is a possibility that light collection efficiency of the fluorescent light in the light collection unit 130 may be degraded and the quality (for example, parallelism and intensity) of the fluorescent light emitted via the light collection unit 130 may be degraded. Therefore, an operation of adjusting the position and the size of the light collection spot 143 is performed during assembly of the light source device 10 or when the light source device 10 is installed in an apparatus such as a projector, in some cases.

Here, the light from the light source unit 110 is reflected by the concave mirror 121 and the convex mirror 122 in this order and is guided toward the light collection spot 143 on the fluorescent substance wheel 140 in the light source device 10 as described above. At this time, the concave mirror 121 and the convex mirror 122 can be arranged such that the optical axes thereof (the central axis of the paraboloidal surface forming the reflective surface of the concave mirror 121 and the central axis of the spherical surface forming the reflective surface of the convex mirror) substantially coincide with each other. Furthermore, the optical axis of the light collection unit 130 is also provided so as to substantially coincide with the optical axes of the concave mirror 121 and the convex mirror 122. Since the optical axes of the light collection optical system that collects the light from the light source unit 110 at the light collection spot 143 are aligned as described above, the positions of the light collection spot 143 in the X axis direction and the Y axis direction can be respectively adjusted by moving the positions of the convex mirror 122 in the X axis direction and the Y axis direction in the light source device 10. Also, the size of the light collection spot 143 can be adjusted by moving the position of the convex mirror 122 in the Z axis direction.

As described above, since the position in the X axis direction, the position in the Y axis direction, and the size of the light collection spot 143 can be respectively independently adjusted by moving the convex mirror 122 in parallel to the three axis directions in the light source device 10, the light collection spot 143 can be more easily and more precisely adjusted. The moving of the convex mirror 122 in parallel to the three axis directions can be realized by the aforementioned adjustment mechanism, for example. In the first embodiment, the positions of the convex mirror 122 in the three axis directions are finely adjusted by the adjustment mechanism, and the position and the size of the light collection spot 143 are adjusted during the assembly of the light source device 10 or when the light source device 10 is installed in an apparatus such as a projector.

(1-2. Comparison with Typical Light Source Device)

According to the first embodiment, it is possible to more easily and more precisely adjust the light collection spot 143 as described above. Here, comparison will be made between the light source device 10 according to the first embodiment and a typical existing light source device in order to more clearly describe the effect of the first embodiment. Here, comparison will be made with a configuration based on the light source device described in Patent Literature 1 as an example of a typical existing light source device.

(1-2-1. Comparison of Device Configurations)

First, a configuration of a typical light source device will be described, and comparison will be made with the configuration of the light source device 10 according to the first embodiment.

Figure 2:
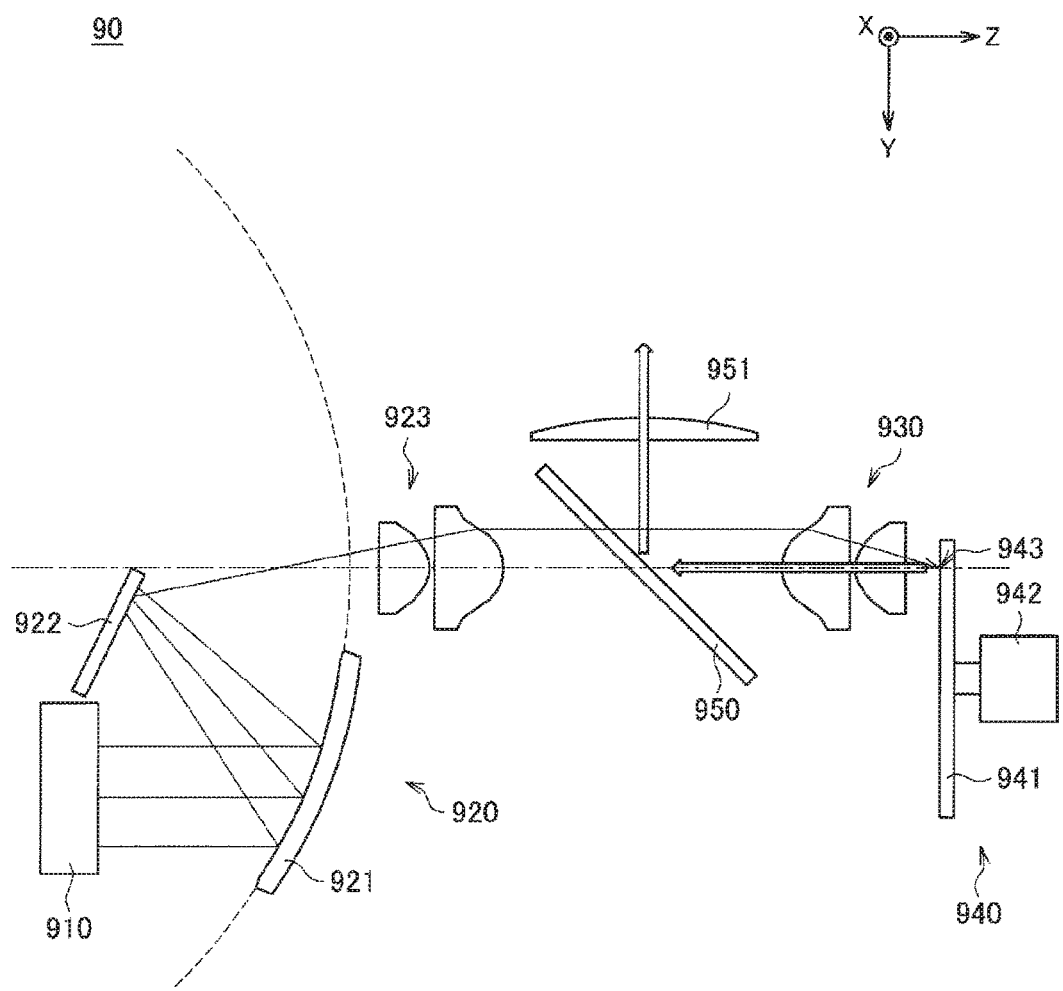
FIG. 2 is a diagram illustrating a configuration example of a typical light source device.

The configuration of the typical light source device will be described with reference to FIG. 2. FIG. 2 is a diagram illustrating a configuration example of the typical light source device.

Referring to FIG. 2, a typical light source device 90 mainly includes a light source unit 910, a light guide unit 920, a light collection unit 930, a fluorescent substance wheel 940, and a spectroscopy unit 950. Here, the aforementioned light source device described in Patent Literature 1 uses a transmissive-type fluorescent substance wheel. The light source device 90 illustrated in FIG. 2 corresponds to a configuration obtained by applying a reflective-type fluorescent substance wheel 940 rather than the transmissive-type fluorescent substance wheel unlike the light source device described in Patent Literature 1.

The light source unit 910 emits substantially parallel light in a predetermined wavelength band. The light source unit 910 includes at least one LD that is a solid-state light source and at least one collimator lens that substantially parallelizes the light emitted from the LD. Since the configuration and the function of the light source unit 910 can be the same as the configuration and the function of the light source unit 110 according to the first embodiment, detailed description thereof will be omitted.

The light guide unit 920 guides the light from the light source unit 910 toward the fluorescent substance wheel 940. The light guide unit 920 includes a concave mirror 921, a planar mirror 922, and a collimating optical system 923. The light from the light source unit 910 is reflected by the concave mirror 921 and the planar mirror 922 in this order, becomes substantially parallel light by being transmitted through the collimating optical system 923, and is guided toward the fluorescent substance wheel 940.

The concave mirror 921 is arranged such that a reflective surface thereof faces the light source unit 910. The concave mirror 921 reflects the light from the light source unit 910 toward the planar mirror 922.

The planar mirror 922 is arranged such that a reflective surface thereof faces the concave mirror 921. The light from the light source unit 910, which has been reflected by the concave mirror 921 and has been incident on the planar mirror 922, is guided in the positive direction of the Z axis. In FIG. 2, the light from each of the plurality of LDs of the light source unit 910 is represented by a single representative solid line in the same manner as in FIG. 1. The light after being reflected by the planar mirror 922 is represented by a single representative solid line.

Here, the light reflected by the planar mirror 922 is not substantially parallel light and is collected at a predetermined point in the positive direction of the Z axis. The light source device 90 includes the collimating optical system 923 at the light collection position. The collimating optical system 923 is formed of a lens group for causing light to become substantially parallel light, causing the light reflected by the planar mirror 922 to become substantially parallel light, and guiding the substantially parallel light toward the fluorescent substance wheel 940.

The fluorescent substance wheel 940 includes a disk-shaped substrate 941, a fluorescent substance (not illustrated) provided on the substrate 941, and a motor 942 that is provided at the center of the substrate 941 and drives the fluorescent substance wheel 940. Since configurations and functions of the fluorescent substance wheel 940, and the substrate 941, the fluorescent substance, the motor 942, and the like that form the fluorescent substance wheel 940 can be the same as the configurations and the functions of the fluorescent substance wheel 140, the substrate 141, the fluorescent substance, the motor 142, and the like according to the first embodiment, detailed description thereof will be omitted. Since a configuration and a function of the light collection unit 930 can also be the same as the configuration and the function of the light collection unit 130 according to the first embodiment, detailed description thereof will be omitted.

In the light source device 90, substantially parallel light obtained by the collimating optical system 923 is collected by the light collection unit 930 and is collected at a light collection spot 943 on the fluorescent substance of the fluorescent substance wheel 940. The fluorescent light radiated from the light collection spot 943 is guided in an incident direction of the light from the light source unit 910 (that is, the negative direction of the Z axis) by the light collection unit 930, becomes substantially parallel light, and is incident on the spectroscopy unit 950 provided between the light guide unit 920 and the light collection unit 930.

The spectroscopy unit 950 is formed of a dichroic mirror, for example. The fluorescent light emitted from the fluorescent substance of the fluorescent substance wheel 940 is reflected by the dichroic mirror and is extracted outward as light output from the light source device 90 via an output lens 951. Since a configuration and a function of the spectroscopy unit 950 can be the same as the configuration and the function of the spectroscopy unit 150 according to the first embodiment, detailed description thereof will be omitted.

The configuration of the typical light source device has been described above with reference to FIG. 2. Here, the aforementioned light source device described in Patent Literature 1 is configured such that a transmissive-type fluorescent substance wheel is arranged at the light collecting position of the light reflected by the planar mirror 922 (that is, the position corresponding to the arrangement position of the collimating optical system 923 in the drawing) and the light reflected by the planar mirror 922 is collected on the fluorescent substance of the fluorescent substance wheel. Since the fluorescent light is emitted from a surface on the opposite side in the incident direction of the excitation light in the case of the transmissive-type fluorescent substance wheel, the fluorescent light is emitted in the positive direction of the Z axis if the transmissive-type fluorescent substance wheel is arranged as described above in the configuration illustrated in FIG. 2.

However, it is difficult to directly arrange the reflective-type fluorescent substance wheel 940 at the light collection position of the light reflected by the planar mirror 922 if it is considered that the reflective-type fluorescent substance wheel 940 is applied to the aforementioned light source device described in Patent Literature 1. This is because it is necessary to arrange the light collection unit for collecting the fluorescent light on the side of the surface, from which the fluorescent light is emitted, of the fluorescent substance wheel 940 since the light emitted from the fluorescent substance of the fluorescent substance wheel 940 is isotropically radiated as described above. That is, it becomes necessary to arrange a lens or the like for collecting the fluorescent light between the planar mirror 922 and the fluorescent substance wheel 940 if the reflective-type fluorescent substance wheel 940 is arranged at the light collection position of the light reflected by the planar mirror 922 illustrated in FIG. 2. However, if the lens is provided, the light reflected by the planar mirror 922 is not collected on the fluorescent substance of the fluorescent substance wheel 940.

If the reflective-type fluorescent substance wheel 940 is used as described above, the light collection unit and other optical members have to be configured such that the light collection unit provided at a stage previous to the fluorescent substance wheel 940 (on the incident side of the excitation light and the emitting side of the fluorescent light) has both the functions of collecting the excitation light at the fluorescent substance of the fluorescent substance wheel and collecting the fluorescent light radiated from the fluorescent substance. Therefore, if the reflective-type fluorescent substance wheel 940 is applied to the aforementioned light source device described in Patent Literature 1, the collimating optical system 923 is provided at the light collection position of the light reflected by the planar mirror 922, and the light collection unit 930 and the fluorescent substance wheel 940 are provided at a stage thereafter.

In contrast, the convex mirror 122 instead of the planar mirror 922 is provided at the position at which the planar mirror 922 in the light source device 90 illustrated in FIG. 2 is provided, in the light source device 10 according to the first embodiment as illustrated in FIG. 1. Furthermore, since the concave mirror 121 and the convex mirror 122 are arranged such that the optical axes of the concave mirror 121 and the convex mirror 122 substantially coincide with each other, the light reflected by the convex mirror 122 is guided as substantially parallel light toward the fluorescent substance wheel 140. Therefore, it is not necessary to provide an optical member corresponding to the collimating optical system 923 illustrated in FIG. 9. A larger number of optical members correspondingly lead to an increase in the total amount of loss of light when the light passes through the optical members. Also, the light source device increases in size, and there is also a concern that the manufacturing costs may also increase. It is possible to reduce the number of optical components in the light source device 10 according to the first embodiment as compared with the typical light source device 90 and to thereby realize a highly-efficient small-sized light source device at low cost.

(1-2-2. Comparison of Methods for Adjusting Light Collection Spot)

Here, the method of adjusting the light collection spot 143 in the light source device 10 according to the first embodiment and a method of adjusting the light collection spot 943 in the typical light source device 90 as described above will be compared.

Figure 3A:
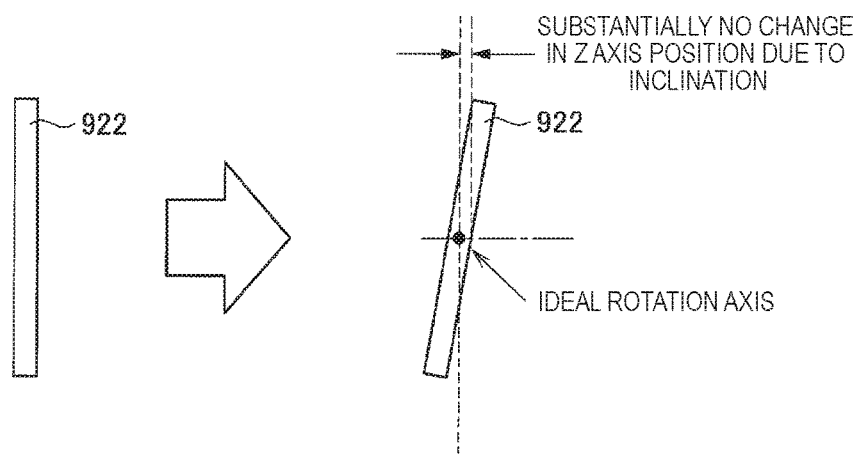
FIGS. 3A and 3B are explanatory diagrams for explaining a change in an angle of a planar mirror of the typical light source device.
Figure 3B:
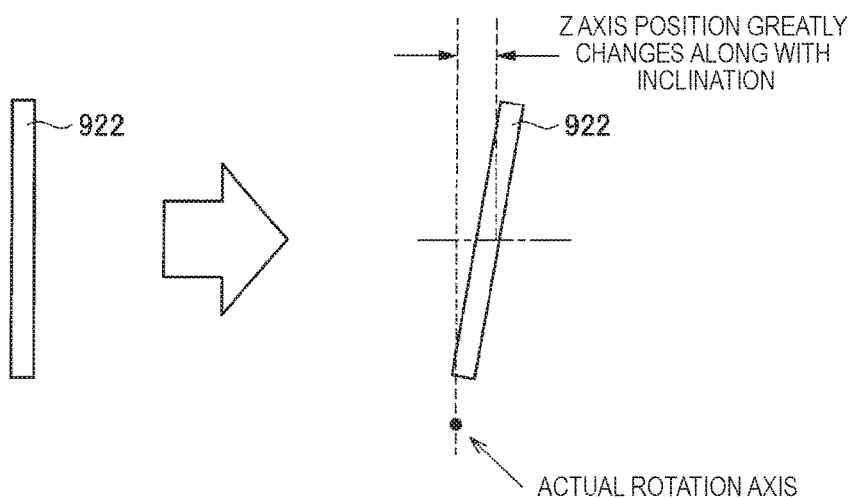

In the typical light source device 90, it is possible to adjust the position and the size of the light collection spot 943 by changing an angle between the reflective surface of the planar mirror 922 and the Z axis (an angle of the planar mirror 922 with respect to the Z axis direction) due to the configuration thereof. Here, a problem that may occur in changing the angle of the planar mirror 922 will be considered with reference to FIGS. 3A and 3B. FIGS. 3A and 3B are explanatory diagrams for explaining a change in an angle of a planar mirror 922 of the typical light source device 90.

If a specific mechanism for changing the angle of the planar mirror 922 with respect to the Z axis direction is considered, where the position of the rotation axis thereof is to be set is important. This is because the position of the planar mirror 922 in the Z axis direction also changes along with rotation of the planar mirror 922 when the planar mirror 922 is rotated with respect to the Z axis direction.

Ideally, it is desirable that the rotation axis of the planar mirror 922 is provided at substantially the center in a longitudinal direction as illustrated in FIG. 3A. This is because in this case, the change in the position of the planar mirror 922 in the Z axis direction can be minimized when the planar mirror 922 rotates about the rotation axis as the center.

However, the mechanism in which the rotation axis is provided at the position illustrated in FIG. 3A has a complicated configuration, which is not practical. It is conceivable that the actual rotation axis may be provided at an end in the longitudinal direction as illustrated in FIG. 3B in many cases. However, if the rotation axis is provided at the end in the longitudinal direction, the position of the planar mirror 922 in the Z axis direction greatly changes along with the rotation of the planar mirror 922.

illustrates light intensity distribution when the planar mirror 922 is the angle of the planar mirror 922 with respect to the Z axis direction was changed. The result is shown in FIGS. 4A, 4B and 4C. FIGS. 4A, 4B and 4C are diagrams illustrating a change in the light collection spot 943 when the angle of the planar mirror 922 with respect to the Z axis direction is changed in the typical light source device 90.

FIGS. 4A, 4B and 4C illustrate light intensity distribution in a predetermined region in an X-Y plane where the light collection spot 943 is present when the angle of the planar mirror 922 with respect to the Z axis direction is changed. In the drawing, a region with a stronger white color represents a region with higher light intensity. That is, the white region represents the light collection spot 943.

FIG. 4A illustrates light intensity distribution when the planar mirror 922 is arranged at the designed position. In FIG. 4A, the substantially circular light collection spot 943 is present at substantially the center in the region illustrated in the drawing.

In contrast, FIG. 4B illustrates a light intensity distribution when the planar mirror 922 is rotated by 0.5° with respect to the Z axis direction. However, only the angle of the planar mirror 922 is changed while the position in the Z axis direction is not changed in FIG. 4B so as to correspond to the situation illustrated in FIG. 3A. Referring to FIG. 4B, it can be understood that the position of the light collection spot 943 has moved in parallel to the Y axis direction in accordance with the change in the angle of the planar mirror 922 as compared with the case illustrated in FIG. 4A. The size of the light collection spot 943 does not substantially change. Ideally, it is possible to adjust only the position of the light collection spot 943 when only the angle of the planar mirror 922 is changed without changing the position thereof in the Z axis direction as described above.

However, the rotation axis of the planar mirror 922 is provided at the end in the longitudinal direction as described above with reference to FIG. 3B in practice in many cases. Therefore, the position of the planar mirror 922 in the Z axis direction can greatly change in conjunction with the rotation thereof.

FIG. 4C illustrates a light intensity distribution when a change in the position in the Z axis direction has occurred at the same time by rotating the planar mirror 922 by 0.5° with respect to the Z axis direction so as to correspond to the situation illustrated in FIG. 3B. Referring to FIG. 4C, it can be understood that the position of the light collection spot 943 has moved and the size thereof has also changed in accordance with the change in the angle and the position of the planar mirror 922 as compared with the case illustrated in FIG. 4A.

The result illustrated in FIG. 4C illustrates that the size of the light collection spot 943 also changes when the angle of the planar mirror 922 with respect to the Z axis direction is changed in order to adjust only the position of the light collection spot 943 in the typical light source device 90. As described above, it is difficult to respectively independently adjust the position and the size of the light collection spot 943 in the typical light source device 90, and it is difficult to state that the light collection spot 943 can be easily adjusted.

In contrast, the positions of the light collection spot 143 in the X axis direction and the Y axis direction can be respectively adjusted by moving the positions of the convex mirror 122 in the X axis direction and the Y axis direction in the light source device 10 according to the first embodiment as described above in (1-1. Configuration of light source device). Also, it is possible to adjust the size of the light collection spot 143 by moving the position of the convex mirror 122 in the Z axis direction.

The present inventors produced an apparatus for experiments with the same configuration as that of the light source device 10 illustrated in FIG. 1 and examined a change in the light collection spot 143 when the convex mirror 122 was moved in the X axis direction, the Y axis direction, and the Z axis direction. The result is shown in FIGS. 5A, 5B, 5C, 6A, 6B, 6C and 6D. FIGS. 5A, 5B and 5C are diagrams illustrating a change in the light collection spot 143 when the convex mirror 122 is moved in the X axis direction and the Y axis direction in the light source device 10 according to the first embodiment. FIGS. 6A, 6B, 6C and 6D are diagrams illustrating a change in the light collection spot 143 when the convex mirror 122 is moved in the Z axis direction in the light source device 10 according to the first embodiment.

FIGS. 5A, 5B and 5C illustrate a light intensity distribution in a predetermined region in an X-Y plane where the light collection spot 143 is present when the positions of the convex mirror 122 in the X axis direction and the Y axis direction are changed. FIGS. 6A, 6B, 6C and 6D illustrate a light intensity distribution in the predetermined region in the X-Y plane where the light collection spot 143 is present when the position of the convex mirror 122 in the Z axis direction is changed. In FIGS. 5A, 5B, 5C, 6A, 6B, 6C and 6D, a region with a stronger white color in the drawing represents a region with higher light intensity in the same manner as in FIGS. 4A, 4B and 4C. That is, it is possible to state that the white region represents the light collection spot 143.

FIG. 5A illustrates a light intensity distribution when the convex mirror 122 is arranged at the designed position. In FIG. 5A, the substantially circular light collection spot 143 is present at substantially the center in the illustrated region.

FIG. 5B illustrates a light intensity distribution when the position of the convex mirror 122 in the X axis direction is changed by −0.4 (mm). Referring to FIG. 5B, it can be understood that the position of the light collection spot 143 has moved in the X axis direction in accordance with the movement of the convex mirror 122 in the X axis direction as compared with the case illustrated in FIG. 5A. At this time, the size of the light collection spot 143 has substantially not changed.

FIG. 5C illustrates a light intensity distribution when the position of the convex mirror 122 in the Y axis direction is moved by −0.4 (mm). Referring to FIG. 5C, it can be understood that the position of the light collection spot 143 has moved in the Y axis direction in accordance with the movement of the convex mirror 122 in the Y axis direction as compared with the case illustrated in FIG. 5A. At this time, the size of the light collection spot 143 has substantially not changed in the same manner as in the case illustrated in FIG. 5B.

It can be recognized from the result illustrated in FIGS. 5A, 5B and 5C that the positions of the light collection spot 143 in the respective axial directions in the X-Y plane can be independently adjusted by changing the position of the convex mirror 122 in the X-Y plane in the light source device 10 according to the first embodiment.

FIG. 6A illustrates an intensity distribution when the convex mirror 122 is arranged at the designed position in the same manner as in FIG. 5A. In FIG. 6A, the substantially circular light collection spot 143 is present at substantially the center in the illustrated region.

FIGS. 6B, 6C and 6D illustrate a light intensity distribution when the arrangement position of the convex mirror 122 in the Z axis direction is changed by 0.1 (mm), 0.2 (mm), and 0.3 (mm), respectively. Referring to FIGS. 6B, 6C and 6D, it can be understood that the size of the light collection spot 143 has gradually increased in accordance with the movement of the convex mirror 122 in the Z axis direction as compared with the case illustrated in FIG. 6A. At this time the position of the light collection spot 143 has substantially not changed. The size of the light collection spot 143 has changed more greatly in the vertical direction than in the horizontal direction in the drawing because the LDs forming the light source unit 110 are aligned in the Y axis direction as illustrated in FIG. 1 in the apparatus for experiments. It is possible to isotropically change the size of the light collection spot 143 by contriving a configuration of the LDs for this.

It can be recognized from the result illustrated in FIGS. 6A, 6B, 6C and 6D that the size of the light collection spot 143 can be adjusted by changing the position of the convex mirror 122 in the Z axis direction in the light source device 10 according to the first embodiment.

As illustrated in FIGS. 5A, 5B, 5C, 6A, 6B, 6C and 6D, the position in the X axis direction, the position in the Y axis direction, and the size of the light collection spot 143 can be respectively independently adjusted by moving the convex mirror 122 in parallel to the three axis directions in the light source device 10. Therefore, it is possible to more easily and more precisely adjust the position and the size of the light collection spot 143 as compared with the typical light source device 90 in which the position and the size of the light collection spot 943 change in conjunction with each other.

Here, a mechanism of moving a member in parallel can be more simply configured than a mechanism of rotating the member, in general. Also, a mechanism of moving a member in parallel and then holding a constant position thereof with high precision can be more easily realized than a mechanism of rotating the member and then holding a constant position thereof with high precision. Therefore, the light source device 10 does not significantly increase in size even if the adjustment mechanism of moving the convex mirror 122 in parallel to the three axis directions is provided inside the light source device 10. Also, a constant position and size of the light collection spot 143 can be maintained with high precision by the position of the convex mirror 122 being held with high precision. According to the first embodiment, it is possible to more easily and more precisely adjust the light collection spot 143 with a simpler configuration than that of the typical light source device 90. By more precisely adjusting the light collection spot 143, it is possible to further improve the quality of the fluorescent light emitted from the fluorescent substance and to further improve the quality of the light output from the light source device 10.

Here, it is also possible to drive the light source device 10 so as to further extend a lifetime of the fluorescent substance of the fluorescent substance wheel 140 by using the mechanism of adjusting the position of the convex mirror 122 in one modification example of the first embodiment. For example, the adjustment mechanism may be configured to automatically operate in accordance with a program, and the adjustment mechanism may dynamically change the position of the convex mirror 122 in the X-Y plane while the light source device 10 is driven. In this manner, the position of the light collection spot 143 dynamically changes while the light source device 10 is driven. Therefore, it is possible to greatly change the relative position of the light collection spot 143 on the fluorescent substance wheel 140 along with the rotation of the fluorescent substance wheel 140, thereby to further minimize degradation in the performance of the fluorescent substance, and to obtain a long lifetime of the fluorescent substance wheel 140.

Hereinafter, other embodiments of the present disclosure will be described in (2. Second embodiment) to (6. Sixth embodiment). The embodiments described below correspond to change of a part of the optical members or addition of new optical members, which are made with respect to the configuration of the light source device 10 according to the first embodiment as described above. Therefore, detailed description of matters overlapping with those in the first embodiment will be omitted, and matters different from those in the first embodiment will be mainly described in the following description of the respective embodiments. Since main configurations in the following respective embodiments are the same as that in the first configuration, the same effects as the effects that can be achieved by the first embodiment as described above can be obtained. Matters described in the aforementioned first embodiment and the respective embodiment described below may be combined with each other within a possible range.

2. Second Embodiment

Figure 7:
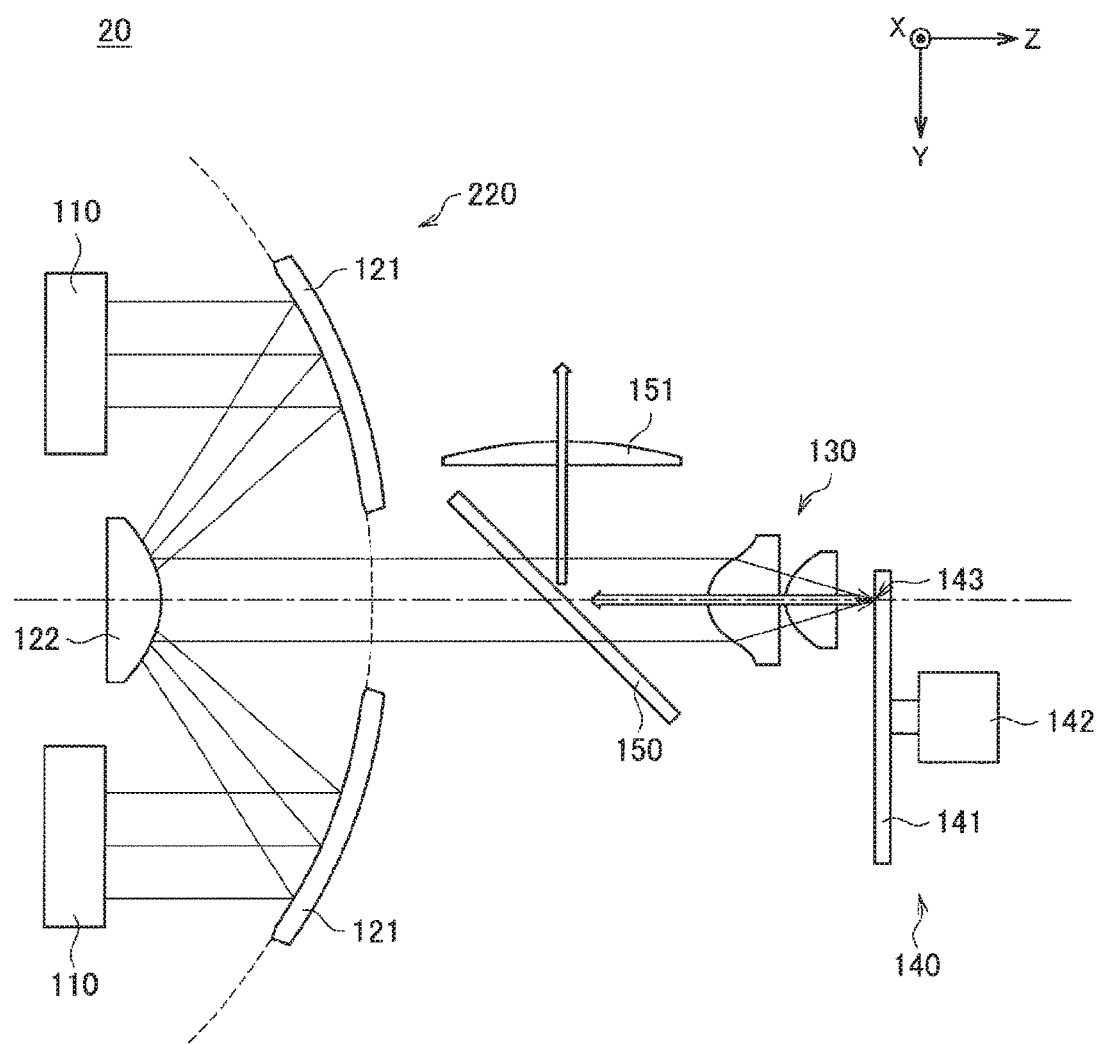
FIG. 7 is a diagram illustrating a configuration example of a light source device according to a second embodiment.

Referring to FIG. 7, a configuration of a light source device according to a second embodiment of the present disclosure will be described. FIG. 7 is a diagram illustrating a configuration example of the light source device according to the second embodiment.

Referring to FIG. 7, a light source device 20 according to the second embodiment mainly includes light source units 110, a light guide unit 220, a light collection unit 130, a fluorescent substance wheel 140, and a spectroscopy unit 150. The light source device 20 according to the second embodiment corresponds to a configuration obtained by changing the configuration of the light guide unit 120 with respect to the light source device 10 according to the aforementioned first embodiment. Since configurations and functions of the other optical members are the same as those in the first embodiment, detailed description thereof will be omitted.

The light guide unit 220 is configured such that pairs of the light source units 110 and the concave mirrors 121 are symmetrically provided with respect to the convex mirror 122 interposed therebetween. Light emitted from the respective light source units 110 is respectively reflected by the concave mirrors 121 that are provided so as to correspond to the respective light source units 110 and is collected at the convex mirror 122. The light emitted from the respective light source units 110 is further reflected by the convex mirror 122, is collected by the light collection unit 130, and is collected at the light collection spot 143 on the fluorescent substance of the fluorescent substance wheel 140.

As described above, a plurality of combinations of the light source units 110 and the concave mirrors 121 are provided for one convex mirror 122 in the light source device 20 according to the second embodiment. In this manner, it is possible to increase the intensity of excitation light at the light collection spot 143 and to increase the intensity of fluorescent light emitted from the fluorescent substance wheel 140 as well.

Here, if it is attempted to increase the numbers of light source units 910 and concave mirrors 921 in the typical light source device 90 illustrated in FIG. 2, for example, it is necessary to additionally provide planar mirrors 922 so as to correspond to the light source units 910 and the concave mirrors 921. In contrast, it is possible to reflect the light from the plurality of light source units 110 and the concave mirrors 121 by one convex mirror 122 in the second embodiment and to thereby keep the device a relatively small size without any need to provide additional convex mirrors 122.

Although the pairs of the light source units 110 and the concave mirrors 121 are symmetrically provided in the Y axis direction with respect to the convex mirror 122 interposed therebetween in the illustrated example, the second embodiment is not limited to such an example. The number in an arrangement and the arrangement position of the combinations of the light source units 110 and the concave mirrors 121 may be arbitrarily selected. For example, four pairs of the light source units 110 and the concave mirrors 121 may be symmetrically provided in the X axis direction and the Y axis direction with respect to the convex mirror 122 interposed therebetween. Alternatively, an arbitrary number of combinations of the light source units 110 and the concave mirrors 121 may be provided at arbitrary positions in the circumference of the convex mirror 122.

3. Third Embodiment

Figure 8:
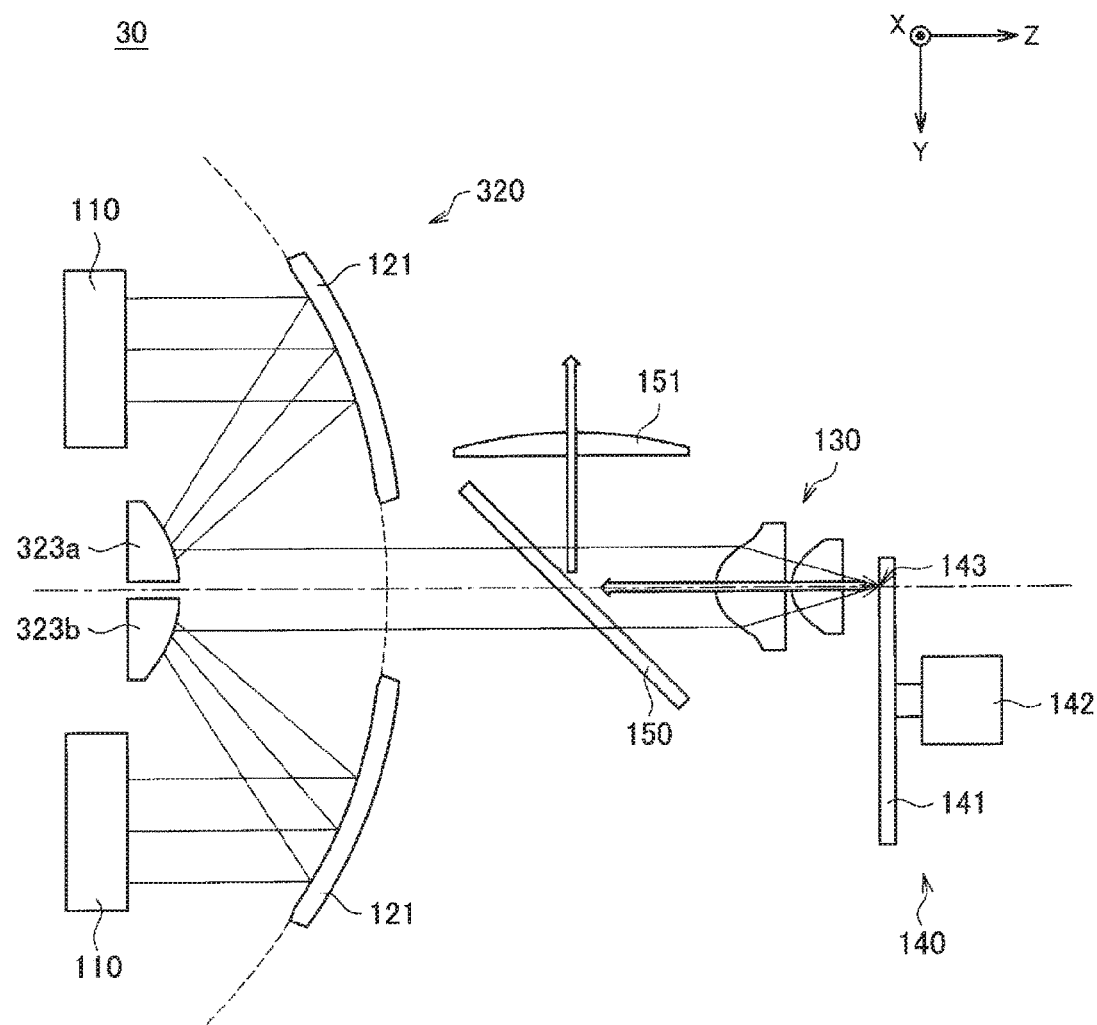
FIG. 8 is a diagram illustrating a configuration example of a light source device according to a third embodiment.

A configuration of a light source device according to a third embodiment of the present disclosure will be described with reference to FIG. 8. FIG. 8 is a diagram illustrating a configuration example of a light source device according to the third embodiment.

Referring to FIG. 8, a light source device 30 according to the third embodiment mainly includes light source units 110, a light guide unit 320, a light collection unit 130, a fluorescent substance wheel 140, and a spectroscopy unit 150. The light source device 30 according to the third embodiment corresponds to a configuration obtained by changing the configuration of the light guide unit 120 with respect to the light source device 10 according to the aforementioned first embodiment. Since configurations and functions of the other optical members are the same as those in the first embodiment, detailed description thereof will be omitted.

The light guide unit 320 is configured such that pairs of the light source units 110 and the concave mirrors 121 are symmetrically provided with respect to a pair of convex mirrors 323a and 323b interposed therebetween. The pair of convex mirrors 323a and 323b have a shape obtained by dividing the convex mirror 122 with the substantially semi-spherical shape illustrated in FIG. 1 into halves. In the following description, the convex mirrors 323a and 323b will also be referred to as divided convex mirrors 323a and 323b for convenience in order to distinguish the convex mirrors 323a and 323b from the convex mirror 122.

Light output from a first light source unit 110 is reflected by a first concave mirror 121 provided so as to correspond to the first light source unit 110 and is collected by the divided convex mirror 323a. The divided convex mirror 323a further reflects the light emitted from the first light source unit 110 and guides the light toward the fluorescent substance wheel 140. In contrast, light emitted from a second light source unit 110 that is different from the first light source unit 110 is reflected by a second concave mirror 121 provided so as to correspond to the second light source unit 110 and is collected at the divided convex mirror 323b. The divided convex mirror 323b further reflects the light emitted from the second light source unit 110 and guides the light toward the fluorescent substance wheel 140.

Both the light emitted from the first light source unit 110, which has been guided by the divided convex mirror 323a, and the light emitted from the second light source unit 110, which has been guided by the divided convex mirror 323b are collected by the light collection unit 130 and are collected at the light collection spot 143 on the fluorescent substance of the fluorescent substance wheel 140.

As described above, the light guide unit 320 is configured such that the combinations of the light source units 110 and the concave mirrors 121 are respectively provided for the plurality of divided convex mirrors 323a and 323b in the light source device 30. By providing the plurality of light source units 110 and the concave mirrors 121, it is possible to increase the intensity of excitation light at the light collection spot 143 and to increase the intensity of fluorescent light emitted from the fluorescent substance wheel 140 as well in the same manner as in the aforementioned second embodiment.

Here, adjustment mechanisms for adjusting the positions of the plurality of divided convex mirrors 323a and 323b in the three axis directions may be respectively provided for the divided convex mirrors 323a and 323b in the third embodiment. In this manner, it is possible to adjust the position and the size of the light collection spot 143 for each of the divided convex mirrors 323a and 323b.

A formation example of the light collection spot 143 in the light source device 30 according to the third embodiment will be described with reference to FIG. 9. FIG. 9 is a diagram illustrating a formation example of the light collection spot 143 in the light source device 30 according to the third embodiment. FIG. 9 illustrates a light intensity distribution in a predetermined region in the X-Y plane where the light collection spot 143 is present in the same manner as in FIGS. 4A, 4B, 4C, 5A, 5B, 5C, 6A, 6B, 6C and 6D. In the drawing, a region with a stronger white color represents a region with higher light intensity, and it is possible to state that the white region represents the light collection spot 143.

As illustrated in the drawing, the positions of the light collection spot 143 for each of the divided convex mirrors 323a and 323b are intentionally deviated from each other, for example, in the third embodiment. That is, a plurality of light collection spots 143 can be formed at different positions so as to correspond to each of the plurality of divided convex mirrors 323a and 323b. In this manner, it is possible to appropriately adjust the intensity such that the intensity of the excitation light, with which the fluorescent substance is irradiated, does not become unnecessarily higher.

Here, it is known that at the fluorescent substance, the intensity of the incident excitation light and the intensity of the radiated fluorescent light are not necessarily proportional to each other and the luminance of the fluorescent light becomes saturated as the intensity of the excitation light becomes higher. Therefore, it is not possible to further improve the luminance of the radiated fluorescent light even if the intensity of the excitation light that is incident on the fluorescent substance further increases in a region where the luminance of the fluorescent light is saturated, which leads to a large loss in terms of efficiency in conversion into the fluorescent light.

Thus, the positions of the divided convex mirrors 323a and 323b in the three axis directions are respectively adjusted such that the light collection spots 143 deviate from each other for the divided convex mirrors 323a and 323b as illustrated in FIG. 9 in the third embodiment. That is, the plurality of light collection spots 143 are provided at different positions. By providing the plurality of light collection spots 143 as described above and appropriately controlling the light intensity at the respective light collection spots 143, there is a possibility of it being possible to improve a conversion efficiency of the fluorescent substance as a whole and to obtain fluorescent light with high luminance at the fluorescent substance as a whole as compared with the case where a single light collection spot 143 is irradiated with light with higher intensity. Also, since the light collection spots 143 are dispersed, it is possible to reduce damage to the fluorescent substance due to the excitation light and to maximize the lifetime of the fluorescent substance.

Although two combinations of the light source units 110, the concave mirrors 121, and the divided convex mirrors are provided in the Y axis direction in the illustrated example, the third embodiment is not limited to such an example. The number in an arrangement and the arrangement position of the combinations of the light source units 110, the concave mirrors 121, and the divided convex mirrors may be arbitrarily selected. For example, a total of four sets of the light source units 110, the concave mirrors 121, and the divided convex mirrors may be provided such that two sets are provided in each of the X axis direction and the Y axis direction. In this case, each divided convex mirror has a shape obtained by dividing a substantially semi-spherical shape into four parts.

4. Fourth Embodiment

Figure 10:
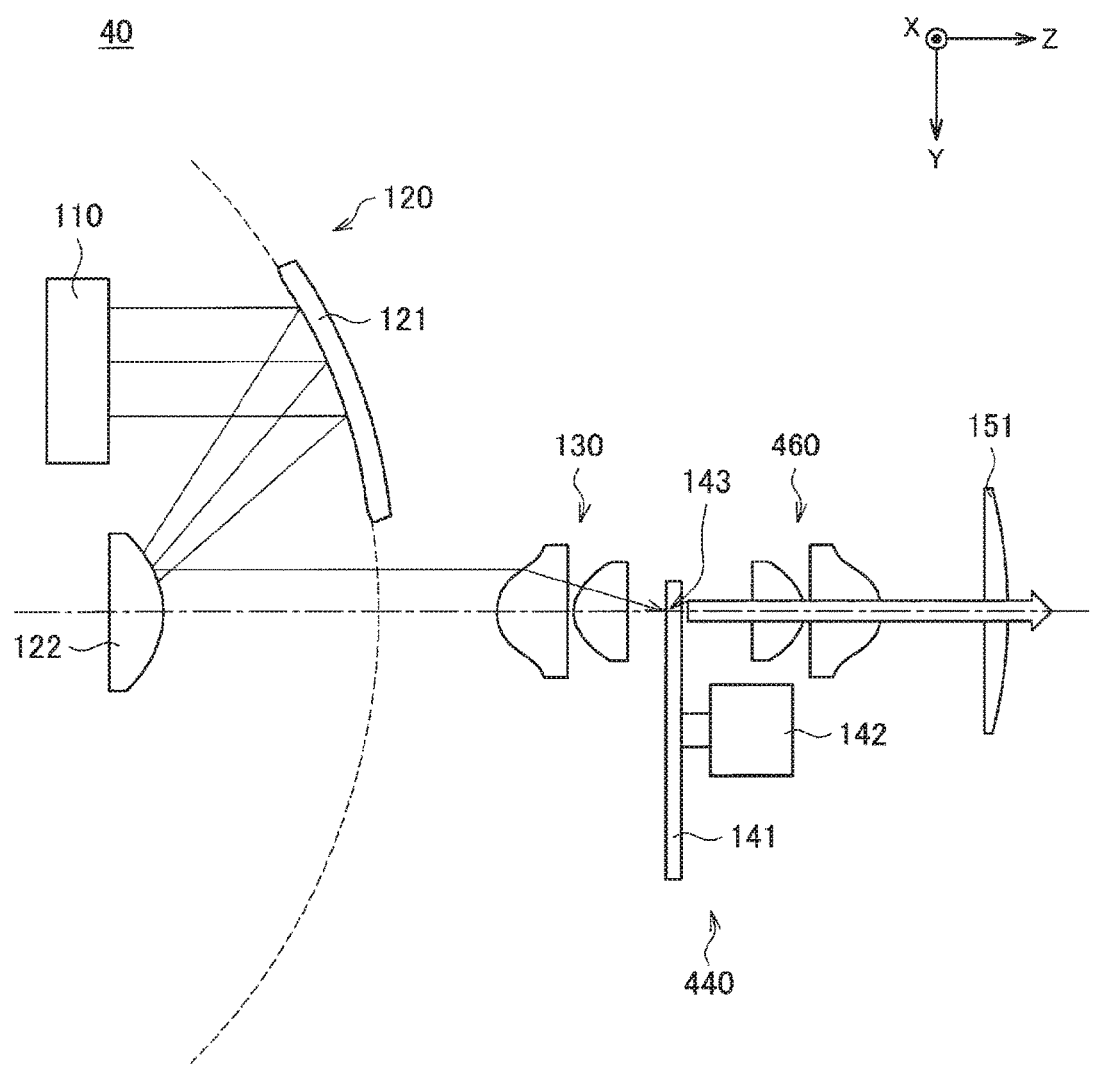
FIG. 10 is a diagram illustrating a configuration example of a light source device according to a fourth embodiment.

A configuration of a light source device according to a fourth embodiment of the present disclosure will be described with reference to FIG. 10. FIG. 10 is a diagram illustrating a configuration example of the light source device according to the fourth embodiment.

Referring to FIG. 10, a light source device 40 according to the fourth embodiment mainly includes a light source unit 110, a light guide unit 120, light collection units 130 and 460, and a fluorescent substance wheel 440. The light source device 40 according to the fourth embodiment corresponds to a configuration obtained by applying a transmissive-type fluorescent substance wheel 440 instead of the reflective-type fluorescent substance wheel 140 in the light source device 10 according to the aforementioned first embodiment. Correspondingly, the spectroscopy unit 150 is omitted from the light source device 10, and the light collection unit 460 is added thereto in the light source device 40. Since configurations and functions of the other optical members are the same as those in the first embodiment, detailed description thereof will be omitted.

As illustrated in the drawing, light from the light source unit 110, which has been guided by the light guide unit 120, is collected at the fluorescent substance on the substrate 141 of the fluorescent substance wheel 440 by the light collection unit 130. Since the fluorescent substance wheel 440 is a transmissive-type fluorescent substance wheel, fluorescent light is radiated in a direction opposite to an incident direction of excitation light. In the illustrated example, light (that is, excitation light) from the light source unit 110 is incident on the fluorescent substance wheel 440 in the negative direction of the Z axis, and the fluorescent light is radiated in the positive direction of the Z axis. Since a configuration and a function of the fluorescent substance wheel 440 are the same as the configuration and the function of the fluorescent substance wheel 140 according to the first embodiment other than that the fluorescent substance wheel 440 is a transmissive-type fluorescent substance wheel, detailed description thereof will be omitted.

The light collection unit 460 that collects the fluorescent light and guides the light as substantially parallel light toward optical members in a later stage is provided on the fluorescent light radiation side of the fluorescent substance wheel 440. A configuration of the light collection unit 460 may be the same as that of the light collection unit 130.

The fluorescent light collected by the light collection unit 460 is extracted outward as light output from the light source device 90 via the output lens 151. Since the fluorescent light is isotropically radiated from the fluorescent substance of the fluorescent substance wheel 440, it is possible to more efficiently extract the fluorescent light to the outside by the light collection unit 460 being provided on the radiation surface thereof. In order to further improve the light collection efficiency of the fluorescent light, the light collection unit 460 can be arranged at a position as close to the fluorescent substance wheel 440 as possible.

Here, since the reflective-type fluorescent substance wheel 140 is used in the first embodiment, the incident direction of the excitation light and the radiation direction of the fluorescent light are the same direction, and the light collection unit 130 has both the function of collecting the excitation light at the fluorescent substance wheel 140 and the function of collecting the fluorescent light radiated from the fluorescent substance wheel 140. In contrast, since the transmissive-type fluorescent substance wheel 440 is used in the fourth embodiment, the light collection units 130 and 460 are provided on the incident side of the excitation light and the radiation side of the fluorescent light, respectively.

Although the case where the transmissive-type fluorescent substance wheel 440 was applied to the light source device 10 according to the first embodiment was described in FIG. 10 as a configuration example of the light source device 40 according to the fourth embodiment, the fourth embodiment is not limited to such an example. For example, the transmissive-type fluorescent substance wheel 440 may be applied to the light source devices 20 and 30 according to the aforementioned second and third embodiments.

Figure 11:
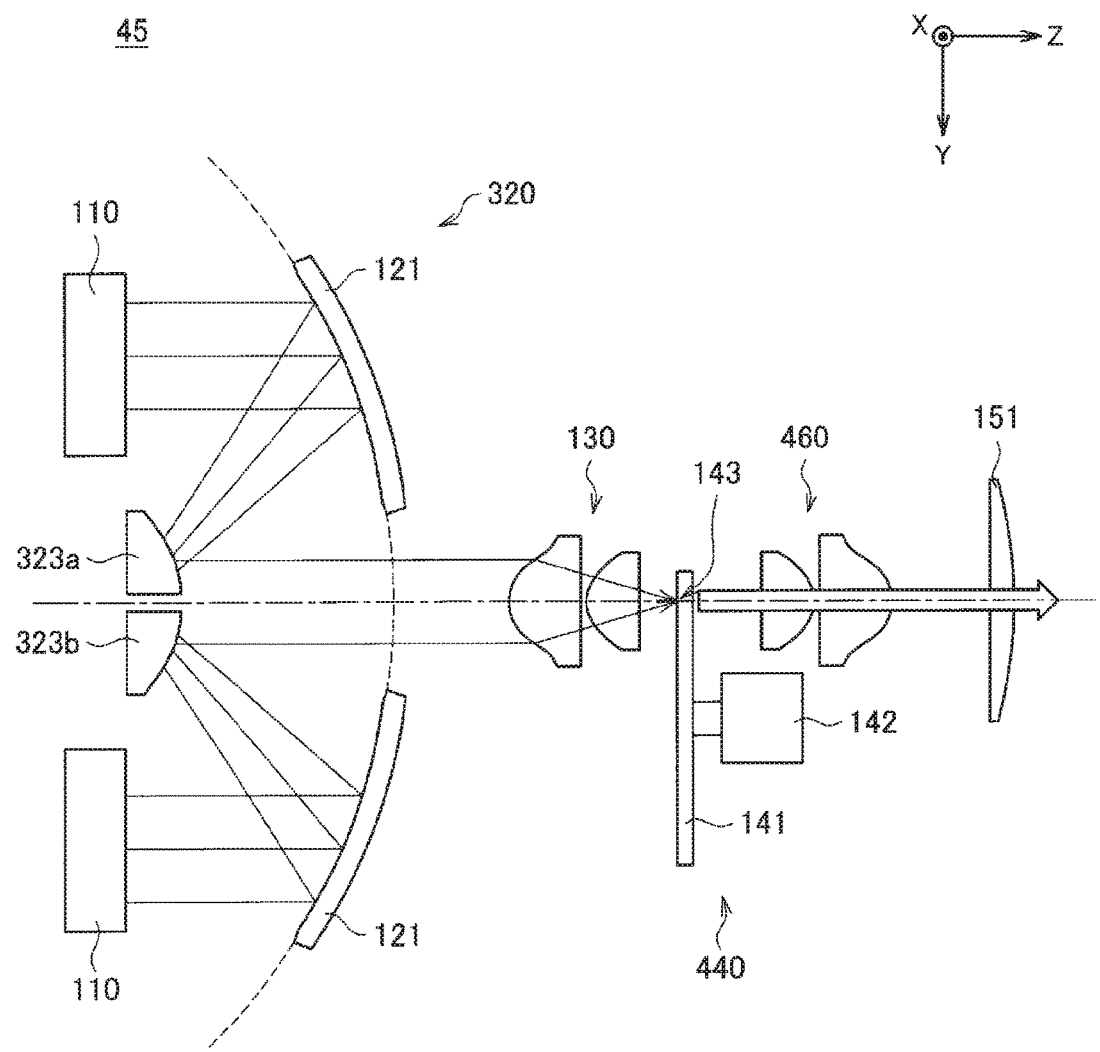
FIG. 11 is a diagram illustrating another configuration example of the light source device according to the fourth embodiment.

Another configuration example of the light source device according to the fourth embodiment will be described as a modification example of the fourth embodiment with reference to FIG. 11. FIG. 11 is a diagram illustrating another configuration example of the light source device according to the fourth embodiment.

Referring to FIG. 11, a light source device 45 according to a modification example of the fourth embodiment mainly includes light source units 110, a light guide unit 320, light collection units 130 and 460, and a fluorescent substance wheel 440. The light source device 45 according to the modification example corresponds to an application of the transmissive-type fluorescent substance wheel 440 to the light source device 30 according to the aforementioned third embodiment.

As described above in (3. Third embodiment), the light guide unit 320 is configured such that the plurality of combinations of the light source units 110, the concave mirrors 121, and the divided convex mirrors are provided. In the light source device 45, light from the respective light source units 110 is respectively guided toward the fluorescent substance wheel 440 by the corresponding divided convex mirrors 323*a* and 323*b* and is collected on the fluorescent substance by the light collection unit 130. At this time, the positions of the light collection spots 143 may be deviated for each of the divided convex mirrors 323*a* and 323*b* as illustrated in FIG. 9 by respectively adjusting the arrangement positions of the divided convex mirrors 323*a* and 323*b* in the three axis directions.

According to the modification example, dispersion of the light collection spots 143 as described above in (3. Third embodiment) is realized also for the transmissive-type fluorescent substance wheel 440, and it is possible to realize an increase in luminance of the fluorescent light and a long lifetime of the fluorescent substance wheel 440.

5. Fifth Embodiment

Figure 12:
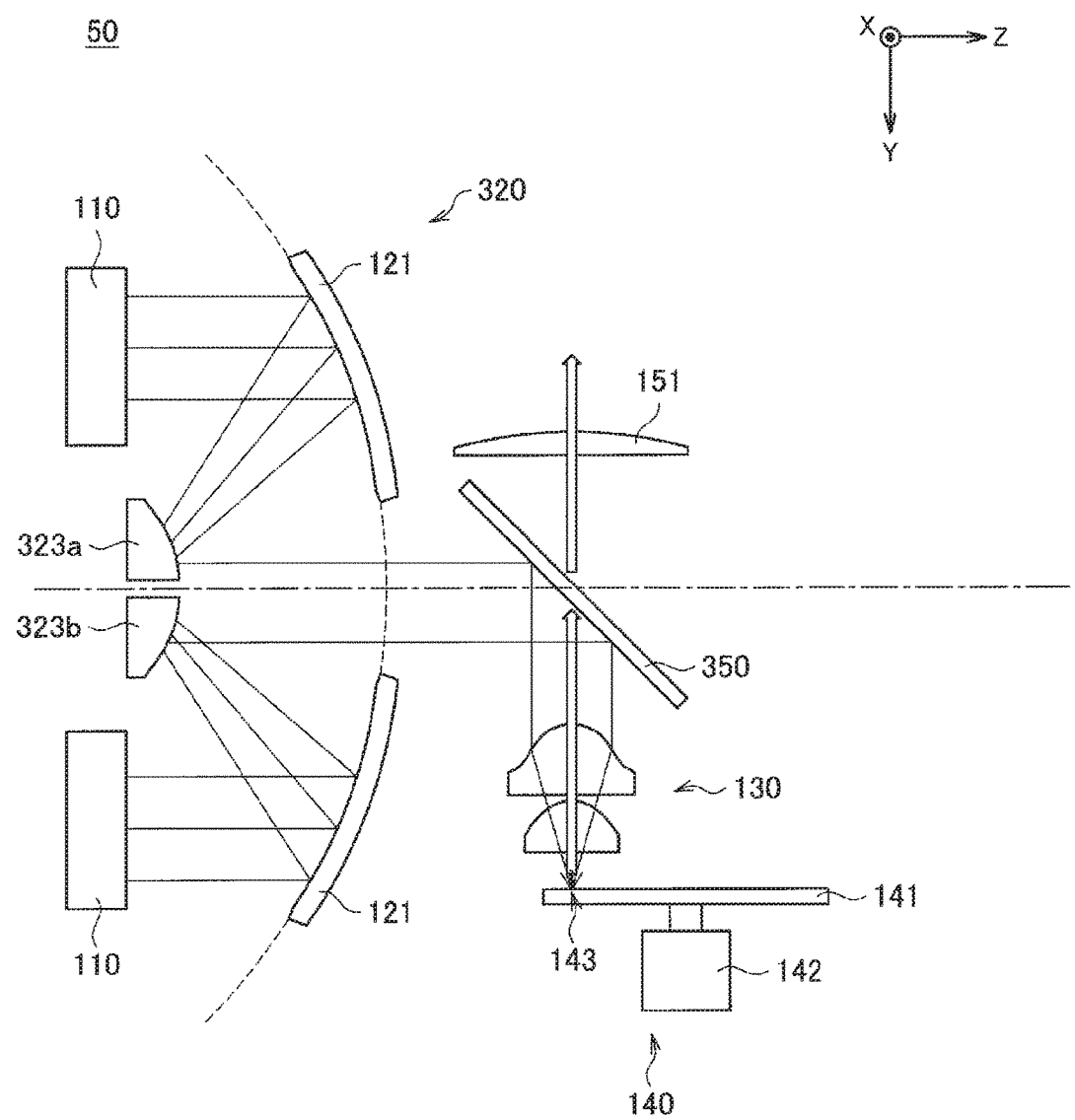
FIG. 12 is a diagram illustrating a configuration example of a light source device according to a fifth embodiment.

A configuration of a light source device according to a fifth embodiment of the present disclosure will be described with reference to FIG. 12. FIG. 12 is a diagram illustrating a configuration example of the light source device according to the fifth embodiment.

Referring to FIG. 12, a light source device 50 according to the fifth embodiment mainly includes light source units 110, a light guide unit 320, a light collection unit 130, a fluorescent substance wheel 140, and a spectroscopy unit 350. The light source device 50 according to the fifth embodiment corresponds to a configuration obtained by changing an arrangement of the respective optical members and correspondingly changing the function of the spectroscopy unit 150 in the light source device 30 according to the aforementioned third embodiment. Since configurations and functions of the other optical members are substantially the same as those in the third embodiment, detailed description thereof will be omitted.

The spectroscopy unit 350 in the fifth embodiment can be formed of a dichroic mirror in the same manner as in the first to third embodiments. However, the dichroic mirror in the fifth embodiment has a transmission property and a reflection property opposite to those in the first to third embodiments. That is, the dichroic mirror according to the fifth embodiment has a capability of reflecting light in the wavelength band corresponding to the light from the light source unit 110 and transmitting light in the wavelength band corresponding to the fluorescent light radiated from the fluorescent substance of the fluorescent substance wheel 140.

As illustrated in the drawing, the light source device 50 is provided with the light collection unit 130 and the fluorescent substance wheel 140 that have optical axes in a direction substantially perpendicular to an advancing direction of the light guided by the light guide unit 320. Light guided in the positive direction of the Z axis by the light guide unit 320 is reflected by the spectroscopy unit 350 provided in the advancing direction thereof, and an optical path thereof is changed by about 90°. In the illustrated example, the optical path of the light is changed to the positive direction of the Y axis by the spectroscopy unit 350. Then, the light is collected at the light collection spot 143 on the fluorescent substance of the fluorescent substance wheel 140 by the light collection unit 130.

The fluorescent light radiated from the fluorescent substance by irradiation with the excitation light is collected by the light collection unit 130, becomes substantially parallel light, and is guided toward the spectroscopy unit 350 (that is, in the negative direction of the Y axis). Since the spectroscopy unit 350 has the capability of transmitting the light in the wavelength band corresponding to the fluorescent light in the fifth embodiment, the fluorescent light radiated from the fluorescent substance wheel 140 is transmitted through the spectroscopy unit 350 and directly advances in the negative direction of the Y axis. Then, the fluorescent light is extracted toward the outside as light output from the light source device 50 via the output lens 151.

According to the fifth embodiment, it is possible to change the arrangement positions of the light collection unit 130 and the fluorescent substance wheel 140 with respect to the light source devices 10, 20, and 30 according to the first to third embodiments by using the dichroic mirror with properties different from those in the first to third embodiments as the spectroscopy unit 350 as described above. Which of the configuration as in the light source devices 10, 20, and 30 according to the first to third embodiments and the configuration as in the light source device 50 according to the fifth embodiment is to be applied in terms of the arrangement positions of the light collection unit 130 and the fluorescent substance wheel 140 may be appropriately selected in consideration of easiness in operations when the light source devices 10, 20, 30, and 50 are assembled, the sizes of case bodies of the light source devices 10, 20, 30, and 50, and the like.

6. Sixth Embodiment

The light source devices according to the aforementioned respective embodiments are designed to directly output the fluorescent light, which is radiated from the fluorescent substance, as the output light thereof. As described above in (1-1. Configuration of light source device), a YAG-based fluorescent substance is used as the fluorescent substance.

Figure 13:
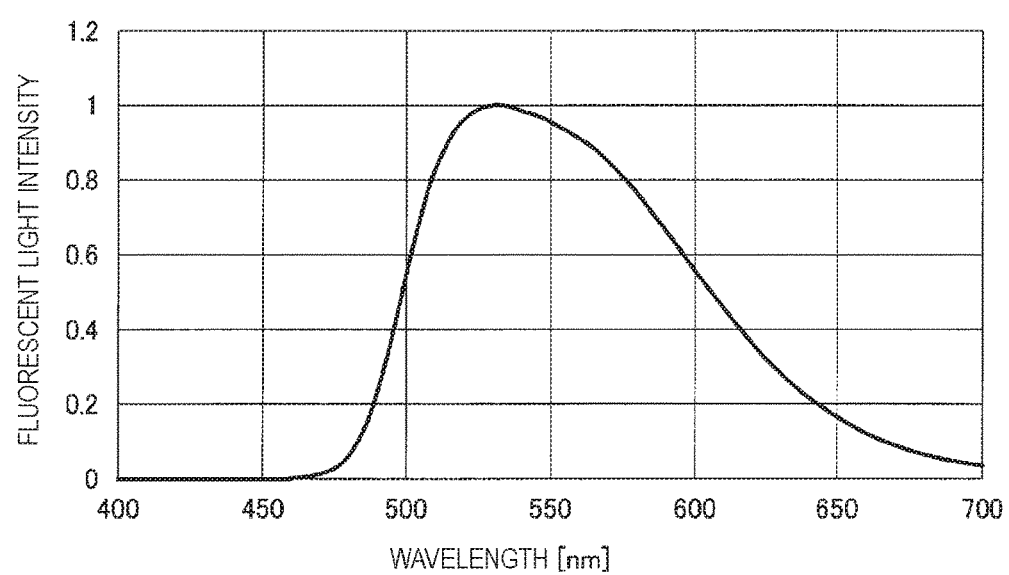
FIG. 13 is a graph illustrating a spectrum of fluorescent light in a YAG-based fluorescent substance.

Here, properties of the fluorescent light emitted from the YAG-based fluorescent substance will be described with reference to FIG. 13. FIG. 13 is a graph illustrating a spectrum of the fluorescent light in the YAG-based fluorescent substrate.

In FIG. 13, a wavelength of the fluorescent light emitted from the YAG-based fluorescent substance is represented on the horizontal axis, an intensity of normalized fluorescent light is represented on the vertical axis, and a relationship therebetween is plotted. Referring to FIG. 13, it can be understood that components from the green band to the red band are included while substantially no components in a blue band are included in the fluorescent light emitted from the YAG-based fluorescent substance. Therefore, it is necessary to supplement light in the blue band in order to output white light from the light source device using the YAG-based fluorescent substance in the light source.

The sixth embodiment is designed to realize the light source device that outputs white light, by adding a light source unit that outputs light in a blue band to the configurations of the light source devices according to the aforementioned respective embodiments.

Figure 14:
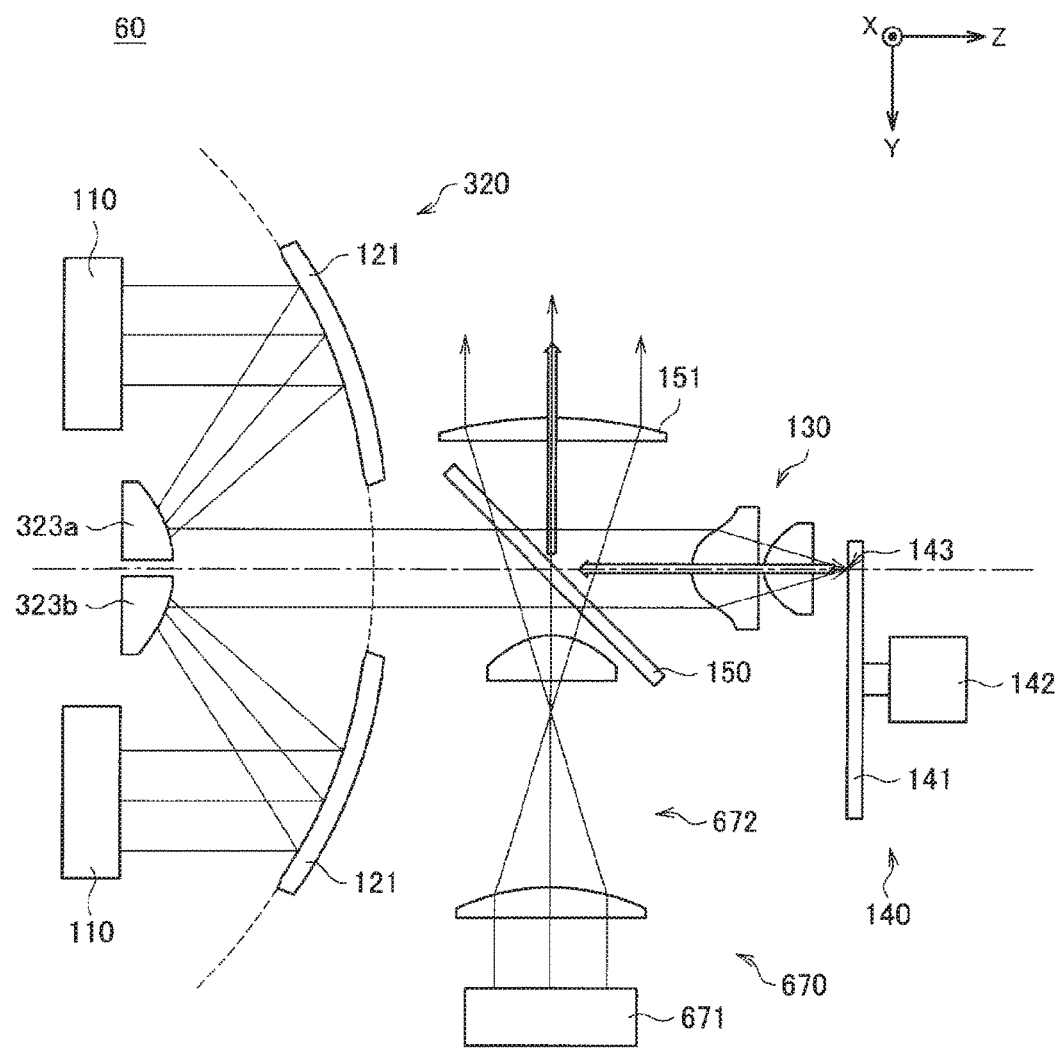
FIG. 14 is a diagram illustrating a configuration example of a light source device according to a sixth embodiment.

A configuration of the light source device according to the sixth embodiment of the present disclosure will be described with reference to FIG. 14. FIG. 14 is a diagram illustrating a configuration example of the light source device according to the sixth embodiment.

Referring to FIG. 14, a light source device 60 according to the sixth embodiment mainly includes light source units 110, a light guide unit 320, a light collection unit 130, a fluorescent substance wheel 140, a spectroscopy unit 150, and an additional light source unit 670. The light source device 60 according to the sixth embodiment corresponds to a configuration obtained by adding the additional light source unit 670 to the light source device 30 according to the aforementioned third embodiment. Since configurations and functions of the other optical members are substantially the same as those in the third embodiment, detailed description thereof will be omitted.

The additional light source unit 670 emits light in a wavelength band different from that of the fluorescent light radiated from the fluorescent substance of the fluorescent substance wheel 140. For example, if the YAG-based fluorescent substance is used as the fluorescent substance of the fluorescent substance wheel 140, the additional light source unit 670 can be configured as a light source that emits light in the blue band. However, the sixth embodiment is not limited to such an example, and the additional light source unit 670 may be appropriately configured so as to emit light with such a wavelength that white light is generated when overlapped with the fluorescent light from the fluorescent substance, in accordance with properties of the fluorescent substance of the fluorescent substance wheel 140.

As illustrated in the drawing, the additional light source unit 670 can be arranged such that additional light from the additional light source unit 670 is overlapped with the fluorescent light as output light in the light source device 60. In the illustrated example, the additional light source unit 670 is arranged on the side opposite to the output lens 151 with the spectroscopy unit 150 interposed therebetween.

The additional light source unit 670 includes a light source unit 671 and a lens group 672. The light source unit 671 may be the same as the light source unit 110 that emits the excitation light for the fluorescent substance of the fluorescent substance wheel 140, and may include at least one LD that emits laser light in the blue band and at least one collimator lens that substantially parallelizes the light emitted from the LD.

Light from the light source unit 671 passes through the lens group 672 and is incident on the spectroscopy unit 150. Since the light source unit that outputs the light in the blue band in the same manner as the light source unit 110 is used as the light source unit 671, the light from the light source unit 671 is also transmitted through the dichroic mirror forming the spectroscopy unit 150. Therefore, the laser light emitted from the light source unit 671 passes through the lens group 672 and the spectroscopy unit 150 and is combined with the fluorescent light radiated from the fluorescent substance wheel 140 and reflected by the spectroscopy unit 150. In this manner, white light is obtained as the light output from the light source device 60 by combining the light from the light source unit 671 and the fluorescent light from the fluorescent substance wheel 140.

Although the lens group 672 includes a plurality of plano-convex lenses in the illustrated example, the configuration of the lens group 672 is not limited to such an example. The lens group 672 may be appropriately configured such that the light from the light source unit 671 and the fluorescent light are appropriately combined and the combined light has desired properties (for example, intensity and parallelism) as white light.

7. Application Examples

One application example of the light source device according to each of the aforementioned embodiments will be described. The light source device according to each of the embodiments can be suitably used as a light source of a projector, for example. Hereinafter, some configuration examples in which the light source device according to each of the aforementioned embodiments is applied to a light source of a projector will be described.

7-1. First Configuration Example

Figure 15:
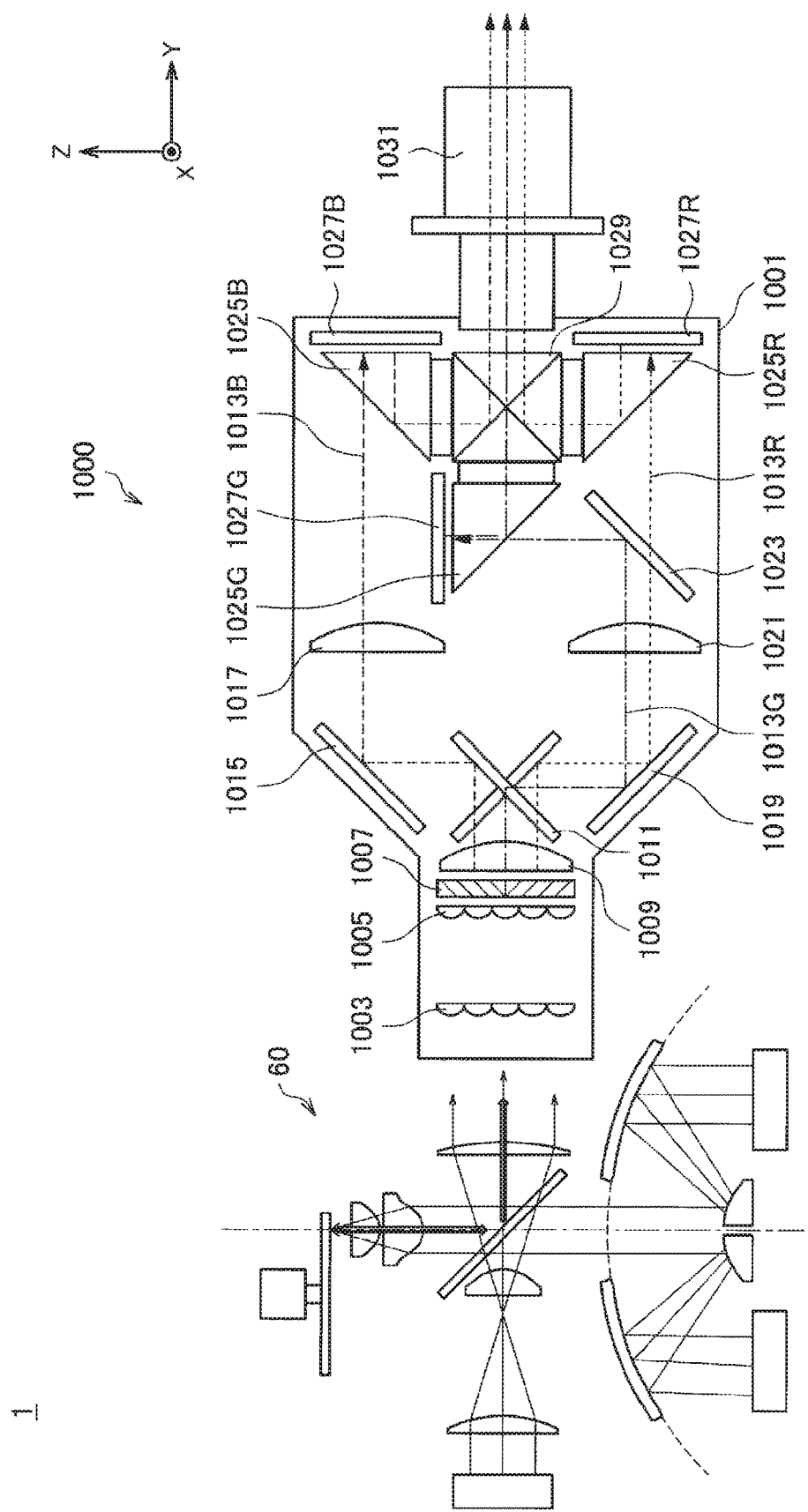
FIG. 15 is a diagram illustrating a configuration of a projector according to a first configuration example.

A first configuration example in which a light source device according to each of the aforementioned embodiments is applied will be described with reference to FIG. 15. FIG. 15 is a diagram illustrating a configuration of a projector according to the first configuration example.

Referring to FIG. 15, a projector 1 according to the first configuration example includes a light source device 60 and an image projection device 1000. Here, since the configuration and the function of the light source device 60 have already been described above in (6. Sixth embodiment), detailed description thereof will be omitted herein.

The image projection device 1000 generates an image by using light output from the light source device 60 and projects the image. The image projection device 1000 includes optical members such as a first fly-eye lens 1003, a second fly-eye lens 1005, a polarization conversion element 1007, a condenser lens 1009, a cross dichroic mirror 1011, a reflective mirrors 1015 and 1019, relay lenses 1017 and 1021, a dichroic mirror 1023, wire grid-type polarization splitter elements 1025R, 1025G, and 1025B, reflective-type liquid crystal panels 1027R, 1027G, and 1027B, and a cross prism 1029 that are mounted on the inside of the case body 1001. A projection unit 1031 is provided in an emitting direction of light combined by the cross prism 1029. The light source device 60 may be assembled inside the case body 1001 along with the other optical members.

Substantially parallel white light output from the light source device 60 is incident on the inside of the case body 1001 of the image projection device 1000, then sequentially adds the first fly-eye lens 1003, the second fly-eye lens 1005, the polarization conversion element 1007, and the condenser lens 1009, and reaches the cross dichroic mirror 1011.

The first fly-eye lens 1003 and the second fly-eye lens 1005 have a function of aligning the incident light, with which the polarization conversion element 1007 is irradiated, from the light source device 60 into a uniform luminance distribution as a whole. The substantially parallel light that is incident from the light source device 60 is divided into a plurality of light fluxes by microlenses of the first fly-eye lens 1003, and images are respectively formed on corresponding microlenses of the second fly-eye lens 1005. Each of the microlenses of the second fly-eye lens 1005 functions as a secondary light source and irradiates the polarization conversion element 1007 with a plurality of parallel light beams with a uniformized luminance as incident light.

The polarization conversion element 1007 has a function of uniformizing polarization states of the incident light that is incident via the first fly-eye lens 1003 and the second fly-eye lens 1005. The light in the polarization state uniformized by the polarization conversion element 1007 is incident on the cross dichroic mirror 1011 via the condenser lens 1009. In FIG. 15, arrows representing advancing directions of blue light 1013B, green light 1013G, and red light 1013R, which are components included in the incident light from the light source device 60, are represented with arrows of mutually different line types in a simulation manner on an optical path after the condenser lens 1009.

The cross dichroic mirror 1011 is formed of a combination of two dichroic mirrors that have mutually different reflection properties and transmission properties. In the first configuration example, the cross dichroic mirror 1011 is configured to split the blue light 1013B, the green light 1013G, and the red light 1013R from each other.

The blue light 1013B split by the cross dichroic mirror 1011 is reflected by the reflective mirror 1015, passes through the relay lens 1017, and is incident on the wire grid-type polarization splitter element 1025B and the reflective-type liquid crystal panel 1027B.

The wire grid-type polarization splitter element 1025B is formed by providing a wire grid at an end surface (an end surface corresponding to an oblique side of a right-angled isosceles triangle), which functions as an incident surface and a reflective surface, of a triangular prism having a bottom surface with a substantially right-angled isosceles triangle shape. The wire grid-type polarization splitter element 1025B is arranged such that the end surface at which the wire grid is provided forms an angle of about 45° with respect to an incident direction of the blue light 1013B. In addition, the reflective-type liquid crystal panel 1027B is arranged on an extended line in the incident direction of the blue light 1013B with the wire grid-type polarization splitter element 1025B interposed therebetween.

The wire grid-type polarization splitter element 1025B has a capability of reflecting S polarized light and transmitting P polarized light at the end surface at which the wire grid is provided. Therefore, the polarization of the blue light 1013B that has been incident on the wire grid-type polarization splitter element 1025B is split, and only a P polarization component, for example, is incident on the reflective-type liquid crystal panel 1027B.

A video signal is applied to the reflective-type liquid crystal panel 1027B, and alignment of liquid crystal molecules in the panel are controlled by an applied electric field based on the video signal. The polarization state of the incident light is changed by the alignment of the liquid crystal molecules, and the incident light is reflected on the same side as the incident direction. That is, the P polarized light that has been incident on the reflective-type liquid crystal panel 1027B becomes S polarized light and is reflected in the direction in which the blue light 1013B has been incident. The light reflected by the reflective-type liquid crystal panel 1027B is blue light that forms an optical image in accordance with the video image.

The light reflected by the reflective-type liquid crystal panel 1027B is incident again on the end surface at which the wire grid of the wire grid-type polarization splitter element 1025B is provided. Since the light reflected by the reflective-type liquid crystal panel 1027B is S polarized, the light is reflected by the end surface and is incident on the cross prism 1029 provided in the reflection direction.

In contrast, the green light 1013G and the red light 1013R split from the blue light 1013B by the cross dichroic mirror 1011 are guided along an optical path different from that of the blue light 1013B, are reflected by the reflective mirror 1019, pass through the relay lens 1021, and are incident on the dichroic mirror 1023. The dichroic mirror 1023 has a capability of reflecting the green light 1013G and transmitting the red light 1013R, and the green light 1013G and the red light 1013R are split from each other by the dichroic mirror 1023.

The green light 1013G split by the dichroic mirror 1023 is incident on the wire grid-type polarization splitter element 1025G and the reflective-type liquid crystal panel 1027G. The red light 1013R split by the dichroic mirror 1023 is incident on the wire grid-type polarization splitter element 1025R and the reflective-type liquid crystal panel 1027R.

Since configurations and functions of the wire grid-type polarization splitter elements 1025G and 1025R are the same as the configuration and the function of the wire grid-type polarization splitter element 1025B and configurations and functions of the reflective-type liquid crystal panels 1027G and 1027R are the same as the configuration and the function of the reflective-type liquid crystal panel 1027B, detailed description will be omitted herein. The S polarization component of the green light 1013G reflecting the video signal on the reflective-type liquid crystal panel 1027G is made to be incident on the cross prism 1029 by the wire grid-type polarization splitter element 1025G and the reflective-type liquid crystal panel 1027G, and the S polarization component of the red light 1013R reflecting the video signal on the reflective-type liquid crystal panel 1027R is incident on the cross prism 1029 with the wire grid-type polarization splitter element 1025R and the reflective-type liquid crystal panel 1027R.

The cross prism 1029 overlaps and combines light of the respective colors that has been incident from the three directions and emits the light toward the projection unit 1031. The projection unit 1031 is provided with a plurality of lenses, which are not illustrated in the drawing, and projects the light combined by the cross prism 1029 onto an external screen, for example, of the projector 1. In this manner, an image based on the video signal applied to the reflective-type liquid crystal panels 1027R, 1027G, and 1027B is displayed in color.

The configuration of the projector 1 according to the first configuration example has been described above. As described above, the light source device 60 according to the sixth embodiment is used as the light source of the projector 1 in the first configuration example. Here, if the position and the size of the light collection spot 143 on the fluorescent substance of the fluorescent substance wheel 140 greatly deviates from the designed values in the light source device 60, for example, there is a possibility that the quality (for example, intensity and parallelism) of the white light output from the light source device 60 may be degraded and thus the quality of the light projected by the projector 1 may also degraded. If the quality of the light projected by the projector 1 is degraded, there is a concern that image quality of the image projected by the projector 1 may deteriorate.

Here, it is possible to adjust the position and the size of the light collection spot 143 on the fluorescent substance of the fluorescent substance wheel 140 by a relatively simple method of adjusting the positions of the divided convex mirrors 323a and 323b in the three axis directions in the light source device 60. Therefore, it is possible to more easily perform the adjustment so as to improve the quality of the light projected from the projector 1 by performing such adjustment of the light collection spot 143 when the light source device 60 is assembled in the projector 1, for example. It is possible to more precisely adjust the position and the size of the light collection spot 143 in the light source device 60, thereby to improve the quality of the projected light, and to obtain a projected image with higher quality.

7-2. Second Configuration Example

A second configuration example in which the light source device according to each of the aforementioned embodiments is applied will be described with reference to FIG. 16.

Figure 16:
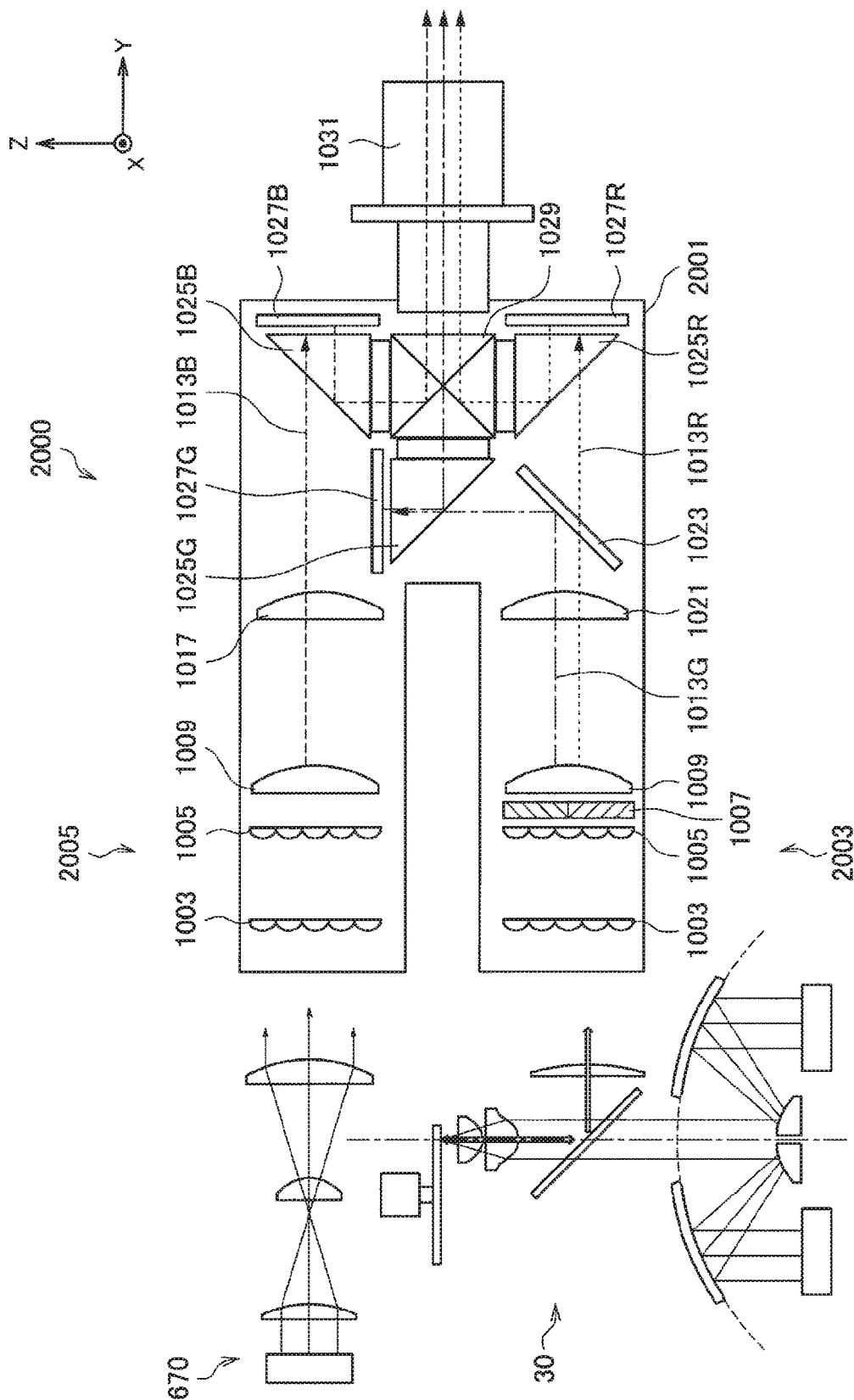
FIG. 16 is a diagram illustrating a configuration of a projector according to a second configuration example.

FIG. 16 is a diagram illustrating a configuration of a projector according to the second configuration example.

The configuration example described below corresponds to a configuration obtained by changing a part of the optical components in the configuration of the projector 1 according to the aforementioned first configuration example or adding a new optical member thereto. Therefore, detailed descriptions of matters overlapping with those in the first configuration example will be omitted, and matters different from those in the first configuration example will be mainly described in the following description of the respective configuration examples. Since main configurations in the following respective configuration examples are the same as that of the first configuration example, the same effect as that achieved by the aforementioned first configuration example can be achieved. The matters described in the aforementioned first configuration example and the respective configuration examples described below may be combined in a possible range.

Referring to FIG. 16, a projector 2 according to the second configuration example includes a light source device 30, an additional light source unit 670, and an image projection device 2000. Here, since the configuration and the function of the light source device 30 have already been described above in (3. Third embodiment), detailed description thereof will be omitted herein. Since the configuration and the function of the additional light source unit 670 have already been described above in (6. Sixth embodiment), detailed description thereof will be omitted herein. Also, any of the aforementioned light source devices 10, 20, 40, and 50 may be used instead of the light source device 30.

As illustrated in the drawing, the projector 2 includes the light source device 30 and the additional light source unit 670 respectively provided as light sources. The light source device 30 functions as a light source that outputs light from the green band to the red band, and the additional light source unit 670 functions as a light source that outputs light in the blue band. Correspondingly, the image projection device 2000 includes a route through which the light from the green band to the red band from the light source device 30 is incident and a route through which the light in the blue band from the additional light source unit 670 is incident provided as separate routes.

The configuration of the image projection device 2000 is the same as that of the image projection device 1000 according to the first configuration example other than the plurality of incident routes corresponding to the plurality of light sources are provided. Therefore, points different from the image projection device 1000 will be mainly described in the following description of the image projection device 2000.

The image projection device 2000 includes optical members such as a first optical system 2003, a second optical system 2005, relay lenses 1017 and 1021, a dichroic mirror 1023, wire grid-type polarization splitter elements 1025R, 1025G, and 1025B, reflective-type liquid crystal panels 1027R, 1027G, and 1027B, and a cross prism 1029 mounted on the inside of the case body 2001. In addition, a projection unit 1031 is provided in an emitting direction of light combined by the cross prism 1029. The light source device 30 and the additional light source unit 670 may be assembled inside the case body 2001 along with the other optical members.

Since configurations and functions of the relay lenses 1017 and 1021, the dichroic mirror 1023, the wire grid-type polarization splitter elements 1025R, 1025G, and 1025B, the reflective-type liquid crystal panels 1027R, 1027G, and 1027B, the cross prism 1029, and the projection unit 1031 are the same as the configurations and the functions of these members described above in (7-1. First configuration example), detailed description thereof will be omitted.

The image projection device 2000 includes a first optical system 2003 provided on an incident route corresponding to the light source device 30 and a second optical system 2005 provided on the incident route corresponding to the additional light source unit 670.

The first optical system 2003 includes a first fly-eye lens 1003, a second fly-eye lens 1005, a polarization conversion element 1007, and a condenser lens 1009.

Substantially parallel light from the green band to the red band output from the light source device 30 is incident on the inside of the case body 2001 of the image projection device 2000, sequentially adds these optical members of the first optical system 2003, and reaches the relay lens 1021. Here, since configurations and functions of the first fly-eye lens 1003, the second fly-eye lens 1005, the polarization conversion element 1007, and the condenser lens 1009 are the same as the configurations and the functions of these members described above in (7-1. First configuration example), detailed description thereof will be omitted.

Light output from the light source device 30, which has been incident on the relay lens 1021, is incident on the dichroic mirror 1023 and is split into green light 1013G and red light 1013R. The green light 1013G is incident on the wire grid-type polarization splitter element 1025G and the reflective-type liquid crystal panel 1027G. The red light 1013R is incident on the wire grid-type polarization splitter element 1025R and the reflective-type liquid crystal panel 1027R. Since behaviors of the green light 1013G and the red light 1013R on the optical paths after the relay lens 1021 are the same as those described above in (7-1. First configuration example), detailed description thereof will be omitted.

The second optical system 2005 includes a first fly-eye lens 1003, a second fly-eye lens 1005, and a condenser lens 1009. Substantially parallel blue laser light output from the additional light source unit 670 is incident on the inside of the case body 2001 of the image projection device 2000, sequentially adds these optical members of the second optical system 2005, and reaches the relay lens 1017. Here, the polarization conversion element 1007 that is provided in the first optical system 2003 can be suitably omitted from the second optical system 2005. This is because the light output from the additional light source unit 670 is laser light and polarization states thereof have already been uniformized.

Light (that is, the blue light 1013B) output from the additional light source unit 670, which has been incident on the relay lens 1017, is incident on the wire grid-type polarization splitter element 1025B and the reflective-type liquid crystal panel 1027B. Since a behavior of the blue light 1013B on the optical path after the relay lens 1017 is the same as that described above in (7-1. First configuration example), detailed description thereof will be omitted.

The red light 1013 R, the green light 1013G, and the blue light 1013B reflecting the video signal are incident on the cross prism 1029, and the cross prism 1029 overlaps and combines the light of the respective colors that has been incident from the three directions, and emits the light toward the projection unit 1031. The projection unit 1031 projects the light combined by the cross prism 1029 on an external screen, for example, of the projector 2, and an image based on the video signal is displayed in color.

The configuration of the projector 2 according to the second configuration example has been described above. As described above, the light source device 30 and the additional light source unit 670 are used as the light sources of the projector 2 in the second configuration example. The additional light source unit 670 is for supplementing the wavelength band component that is not included in the light output from the light source device 30.

By preparing the additional light source unit 670 as a separate light source without it being assembled in the light source device 30 and causing the light from the additional light source unit 670 and the light source device 30 to be incident on the image projection device 2000 through the respectively separate routes, it is possible to reduce a burden on the optical members on the incident route of the image projection device 2000 and to extend lifetime of these optical members. Therefore, a more reliable projector 2 is realized.

In addition, the light source device 30 has a simpler configuration as compared with the light source device 60 including the additional light source unit 670 assembled therein. By forming the light source device 30 with a smaller number of optical members, it is possible to improve reliability of the light source device 30 itself.

Here, it is possible to realize a projector that is compatible with a wider wavelength band by further adding a light source unit capable of emitting light in a wavelength band different from that of the additional light source unit 670 to the light source device 30 in the second configuration example.

Figure 17:
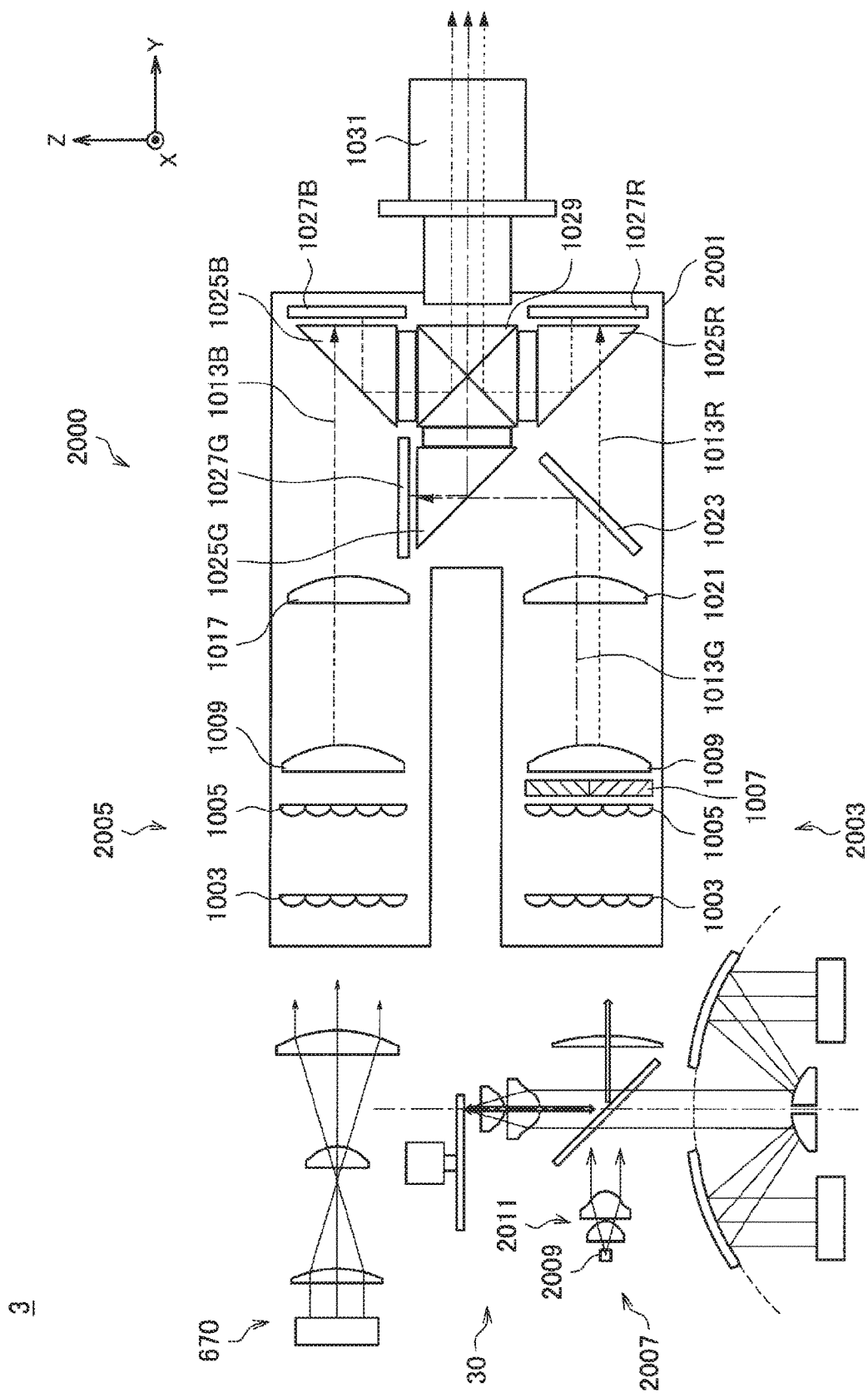
FIG. 17 is a diagram illustrating a configuration of a projector according to a modification example of the second configuration example.

FIG. 17 illustrates a configuration of a projector when such a light source unit capable of emitting light in a wavelength band different from that of the additional light source unit 670 is further added to the light source device 30 as a modification example of the second configuration example. FIG. 17 is a diagram illustrating a configuration of the projector according to the modification example of the second configuration example.

Referring to FIG. 17, a projector 3 according to the modification example corresponds to a configuration obtained by adding an additional light source unit 2007 to the light source device 30 in the projector 2 illustrated in FIG. 16. The additional light source unit 2007 is a light source unit that emits light in a wavelength band different from that of the additional light source unit 670. The additional light source unit 2007 is arranged at a position similar to the arrangement position of the additional light source unit 670 described above in (6. Sixth embodiment) in the light source device 30.

For example, the additional light source unit 2007 includes a light source 2009 that emits infrared light and a lens group 2011. The infrared light emitted from the light source 2009 passes through the lens group 2011, becomes substantially parallel light, is combined with fluorescent light radiated from the fluorescent substance wheel 140, and is incident on the image projection device 2000. With such a configuration, the light emitted from the projector 3 becomes light in a wider wavelength including an infrared band. The projector 3 can be utilized for simulation when a device that can use both visible light and infrared light, such as a night vision device, is developed.

7-3. Third Configuration Example

Figure 18:
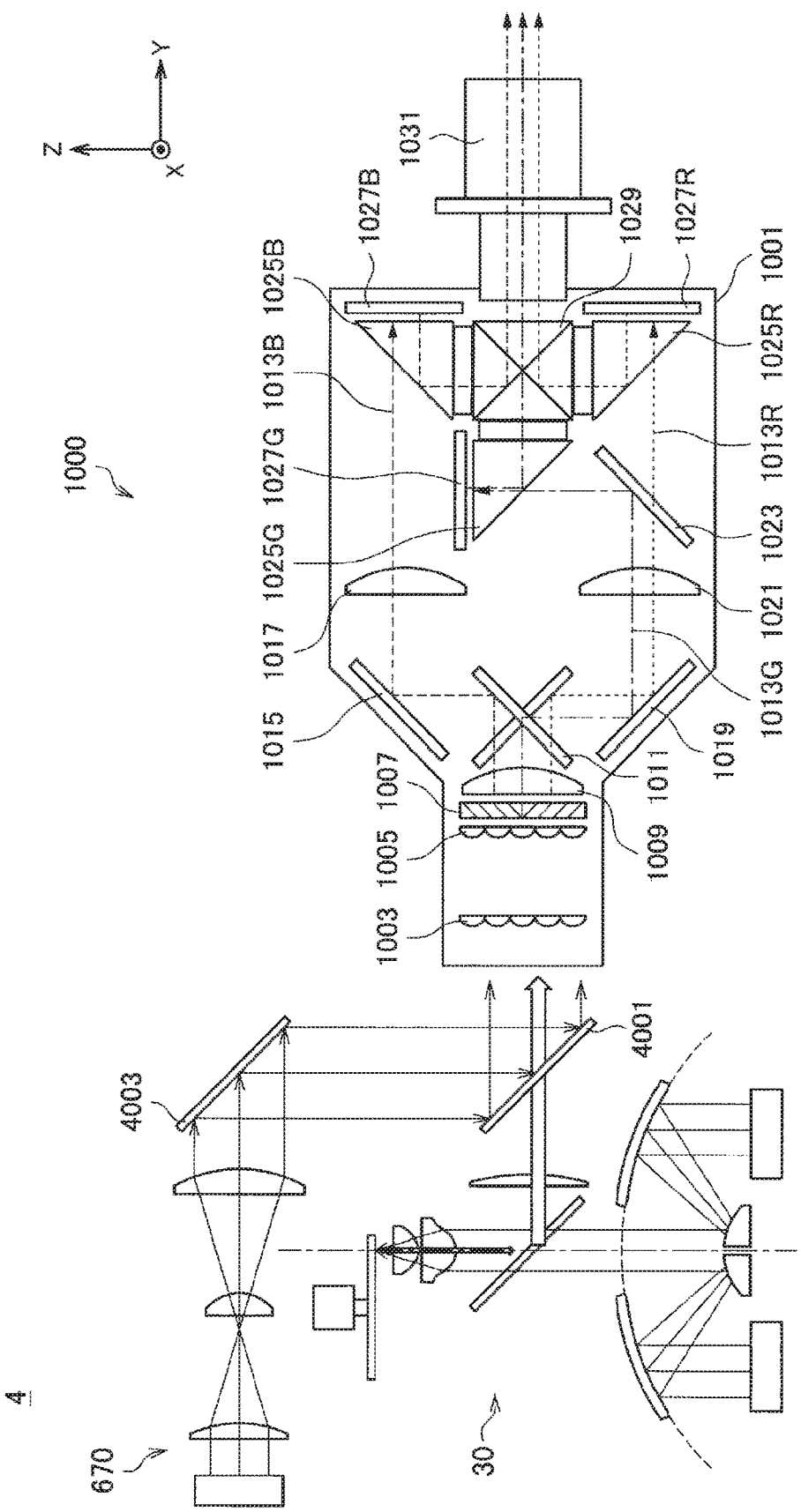
FIG. 18 is a diagram illustrating a configuration of a projector according to a third configuration example.

A third configuration example in which the light source device according to each of the aforementioned embodiments is applied to a projector will be described with reference to FIG. 18. FIG. 18 is a diagram illustrating a configuration of the projector according to the third configuration example.

Referring to FIG. 18, a projector 4 according to the third configuration example includes a light source device 30, an additional light source unit 670, and an image projection device 1000. Here, since the configuration and the function of the light source device 30 have already been described above in (3. Third embodiment), detailed description thereof will be omitted herein. Also, since the configuration and the function of the additional light source unit 670 have already been described above in (6. Sixth embodiment), detailed description thereof will be omitted herein. In addition, any of the aforementioned light source devices 10, 20, 40, and 50 may be used instead of the light source device 30.

As illustrated in the drawing, the projector 4 includes the light source device 30 and the additional light source unit 670 respectively provided as light sources. However, unlike the projector 2 according to the second configuration example, the light from the light source device 30 and the light from the additional light source unit 670 are combined at a stage previous to the incidence of the light on the image projection device 1000, and the combined light is incident on the image projection device 1000 through the same route in the projector 4.

Specifically, a dichroic mirror 4001 is provided at the stage previous to the incidence of the light output from the light source device 30 on the image projection device 1000, and a reflective mirror 4003 that guides the light from the additional light source unit 670 toward the dichroic mirror 4001 is provided in the emitting direction of the light from the additional light source unit 670 as illustrated in the drawing, for example. The dichroic mirror 4001 has a property of transmitting the light from the green band to the red band from the light source device 30 and reflecting the blue laser light from the additional light source unit 670, and the combined light thereof is incident on the image projection device 1000. The configuration of combining the light from the light source device 30 and the light from the additional light source unit 670 is not limited to the illustrated example, and may be appropriately set.

As described above, the third configuration example corresponds to the combination of the first configuration example and the second configuration example. Since a behavior of the combined light after being incident on the image projection device 1000 is the same as described above in (7-1. First configuration example), detailed description thereof will be omitted.

The configuration of the projector 4 according to the third configuration example has been described above. As described above, the light source device 30 and the additional light source unit 670 are used as the light sources of the projector 4 in the fourth configuration example. In addition, the light from the light source device 30 and the light from the additional light source unit 670 are combined at the stage previous to the incidence on the image projection device 1000, and the combined light is incident on the image projection device 1000 through the same route.

Here, when an incident route to the image projection device 2000 is formed so as to correspond to each light source as in the projector 2 according to the aforementioned second configuration example, there is a possibility that the case body 2001 of the image projection device 2000 may increase in size and the projector 2 itself may increase in size due to the plurality of incident routes provided although it is possible to reduce the burden on the optical members in each incident route. According to the third configuration example, there is a possibility that the projector 4 can be further downsized while securing the reliability of the light sources by using the highly reliable light source device 30 with a simpler configuration and using the image projection device 1000 with the case body 1001 that can be further downsized.

7-4. Fourth Configuration Example

Figure 19:
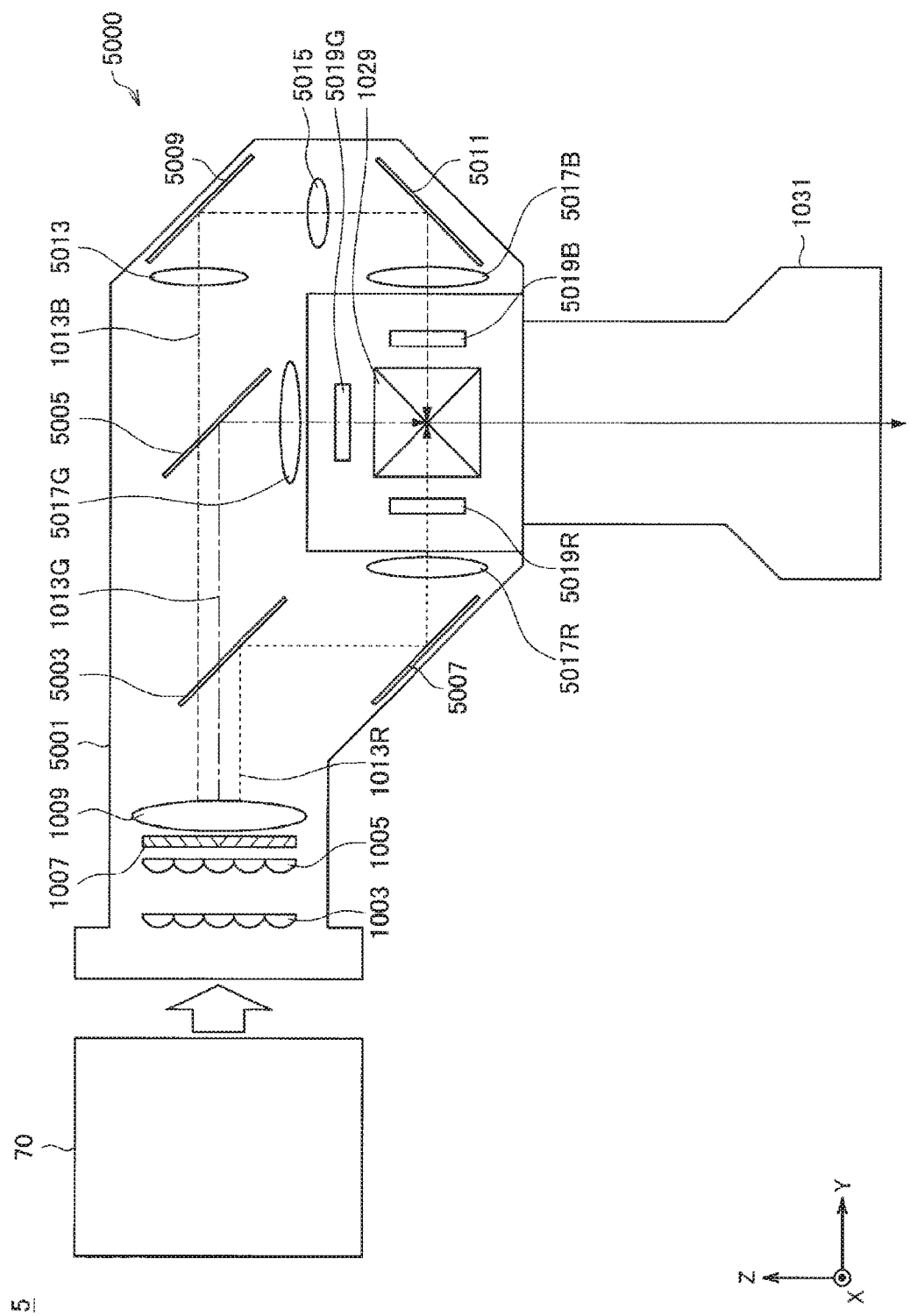
FIG. 19 is a diagram illustrating a configuration of a projector according to a fourth configuration example.

A fourth configuration example in which the light source device according to each of the aforementioned embodiments is applied to a projector will be described with reference to FIG. 19. FIG. 19 is a diagram illustrating a configuration of a projector according to the fourth configuration example. While the first to third configuration examples use reflective-type liquid crystal panels, the fourth configuration example corresponds to a configuration using a transmissive-type liquid crystal panel.

Referring to FIG. 19, a projector 5 according to the fourth configuration example includes a light source section 70 and an image projection device 5000.

The light source section 70 outputs white light substantially in parallel to the image projection device 5000. As the light source section 70, the light source device 60 according to the aforementioned sixth embodiment or a combination of any of the light source devices 10, 20, 30, 40, and 50 according to the first to fifth embodiments as used in the third configuration example and the additional light source unit 670 is used.

The image projection device 5000 generates an image by using light output from the light source section 70 and projects the image. The image projection device 5000 includes optical members such as a first fly-eye lens 1003, a second fly-eye lens 1005, a polarization conversion element 1007, a condenser lens 1009, dichroic mirrors 5003 and 5005, reflective mirrors 5007, 5009, and 5011, relay lenses 5013 and 5015, field lenses 5017R, 5017G, and 5017B, liquid crystal light valves 5019R, 5019G, and 5019B, and a cross prism 1029 that are mounted on the inside of the case body 5001. Also, a projection unit 1031 is provided in an emitting direction of light combined by the cross prism 1029. The light source section 70 may be assembled inside the case body 5001 along with the other optical members.

Substantially parallel white light output from the light source section 70 is incident on the inside of the case body 5001 of the image projection device 5000, sequentially adds the first fly-eye lens 1003, the second fly-eye lens 1005, the polarization conversion element 1007, and the condenser lens 1009, and reaches the dichroic mirror 5003. Since configurations and functions of the first fly-eye lens 1003, the second fly-eye lens 1005, the polarization conversion element 1007, and the condenser lens 1009 are the same as the configurations and the functions of these members described above in (7-1. First configuration example), detailed description thereof will be omitted.

The dichroic mirrors 5003 and 5005 have a characteristic of selectively reflecting light in a predetermined wavelength band and transmitting light in the other wavelength bands. For example, the dichroic mirror 5003 is configured so as to reflect the red light 1013 R and transmit the blue light 1013B and the green light 1013G.

The red light 1013R which has been selectively reflected and split by the dichroic mirror 5003 is reflected by the reflective mirror 5007, is parallelized by passing through the field lens 5017R, and is then incident on the liquid crystal light valve 5019R for modulating the red light.

The liquid crystal light valve 5019R includes a transmissive-type liquid crystal panel and a polarization panel, for example. A video signal is applied to the transmissive-type liquid crystal panel of the liquid crystal light valve 5019R, a polarization state of the red light 1013R passing through the liquid crystal light valve 5019R is modulated for each pixel, and the light is incident on the cross prism 1029 as red light forming an optical image in accordance with the video signal.

In contrast, the blue light 1013B and the green light 1013G transmitted through the dichroic mirror 5003 are incident on the dichroic mirror 5005 at a later stage. The dichroic mirror 5005 is configured to reflect the green light 1013G and transmit the blue light 1013B.

The green light 1013G that has been selectively reflected and split by the dichroic mirror 5005 is parallelized by passing through the field lens 5017G and is then incident on the liquid crystal light valve 5019G for modulating the green light. Also, the blue light 1013B transmitted through the dichroic mirror 5005 sequentially passes through the relay lens 5013, the reflective mirror 5009, the relay lens 5015, and the reflective mirror 5011, is parallelized by passing through the field lens 5017B, and is then incident on the liquid crystal light valve 5019B for modulating the blue light.

Since configurations and functions of the liquid crystal light valve 5019G and the liquid crystal light valve 5019B are the same as those of the aforementioned liquid crystal light valve 5019R, detailed description thereof will be omitted. The polarization state of the green light 1013G passing through the liquid crystal light valve 5019G is modulated for each pixel, and the light is incident on the cross prism 1029 as green light forming an optical image in accordance with the video signal. Similarly, the polarization state of the blue light 1013B passing through the liquid crystal light valve 5019B is modulated for each pixel, and the light is incident on the cross prism 1029 as green light forming an optical image in accordance with the video signal.

The cross prism 1029 overlaps and combines the light of the respective colors that has been incident from the three directions and emits the light toward the projection unit 1031. The projection unit 1031 irradiates an external screen or the like of the projector 5 with the light combined by the cross prism 1029. In this manner, an image based on the video signal applied to the transmissive-type liquid crystal panels of the liquid crystal light valves 5019R, 5019G, and 5019B is displayed in color. Since configurations and functions of the cross prism 1029 and the projection unit 1031 are the same as the configurations and the functions of these members described above in (7-1. First configuration example), detailed description thereof will be omitted.

The configuration of the projector 5 according to the fourth configuration example has been described above. As described above, the light source device according to each of the aforementioned embodiments can be suitably applied to the projector 4 using the transmissive-type liquid crystal panel.

7-5. Summary of Application Examples

The cases where these light source devices have been applied to the projectors have been described above as application examples of the light source devices according to the aforementioned respective embodiments. As described above, it is possible to more easily adjust the light collection spot on the fluorescent substance in the light source device according to the respective embodiments of the present disclosure, and thereby to more easily improve the quality of light projected by the projector when the quality deteriorates due to positional deviation of the light collection spot, for example, by applying these light source devices to the projector. Also, it is possible to more precisely adjust the light collection spot in the light source devices according to the respective embodiments, thereby to improve the quality of light projected by the projector, and to obtain a projected image with higher quality.

Specific configurations of the image projection devices 1000, 2000, and 5000 and the projection unit 1031 in the respective configuration examples described above are not limited to the illustrated configurations. Various existing configurations that can be used for a typical projector may be applied as the image projection devices 1000, 2000, and 5000 and the projection unit 1031.

The application examples of the light source devices according to the respective embodiments of the present disclosure are not limited to the projector. The light source devices may be applied to other apparatuses. For example, the light source devices may be applied to illumination apparatuses. By applying the light source devices to an illumination apparatus, it becomes possible to more easily adjust the quality of irradiation light of the illumination apparatus and to maintain a high quality for the irradiation light.

8. Supplementary Notes

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

A light source device including:

at least one light source unit that emits substantially parallel light in a predetermined wavelength band; and a light guide unit that guides the light from the light source unit toward a light collection spot, wherein the light from the light source unit is sequentially reflected by a concave mirror and a convex mirror and is guided toward the light collection spot in the light guide unit.

(2)

The light source device according to (1), wherein the concave mirror and the convex mirror are arranged such that a central axis of a reflective surface shape of the concave mirror substantially coincides with a central axis of a reflective surface shape of the convex mirror.

(3)

The light source device according to (1) or (2), further including:

an adjustment mechanism that independently adjusts respective positions of the convex mirror in three axis directions.

(4)

The light source device according to any one of (1) to (3), wherein the light collection spot is provided on a fluorescent substance that emits fluorescent light in response to the light from the light source unit.

(5)

The light source device according to (4), wherein a fluorescent substance wheel with a substrate on which the fluorescent substance is provided is a reflective-type fluorescent substance wheel that radiates fluorescent light in a same direction as an incident direction of the light from the light source unit.

(6)

The light source device according to (4), wherein a fluorescent substance wheel with a substrate on which the fluorescent substance is provided is a transmissive-type fluorescent substance wheel that radiates fluorescent light in a direction opposite to an incident direction of the light from the light source unit.

(7)

The light source device according to any one of (1) to (6), wherein a reflective surface shape of at least any of the concave mirror and the convex mirror is an aspherical shape.

(8)

The light source device according to any one of (1) to (7), wherein a plurality of combinations, each of which includes the light source unit and the concave mirror, are provided for the one convex mirror.

(9)

The light source device according to (8), wherein the combinations, each of which includes the light source unit and the concave mirror, are provided so as to be symmetric with respect to the convex mirror interposed therebetween.

(10)

The light source device according to (8) or (9), wherein divided convex mirrors with a shape obtained by dividing the convex mirror are provided so as to correspond to the plurality of respective combinations, each of which includes the light source unit and the concave mirror, light that is emitted from a first light source unit and is reflected by a first concave mirror is reflected by a first divided convex mirror and is guided toward the light collection spot, and light that is emitted from a second light source unit and is reflected by a second concave mirror is reflected by a second divided convex mirror and is guided toward the light collection spot.

(11)

The light source device according to (10), wherein a plurality of the light collection spots are formed at different positions so as to correspond to the plurality of respective divided convex mirrors.

(12)

The light source device according to any one of (1) to (11), wherein a position of the light collection spot in a plane perpendicular to light reflected by the convex mirror is dynamically changed by adjustment of a position of the convex mirror in the plane during driving of the light source device.

(13)

The light source device according to any one of (1) to (12), wherein the light collection spot is provided on a fluorescent substance that emits fluorescent light in response to the light from the light source unit, the light source device further includes a second light source unit that emits light in a wavelength band different from that of the fluorescent light, and the light source device outputs light obtained by combining the fluorescent light and the light emitted from the second light source unit.

(14)

A projector including:

a light source device that includes at least one light source unit that emits substantially parallel light in a predetermined wavelength band and a light guide unit that guides the light from the light source unit toward a light collection spot; and an image projection device that generates an image by using the light output from the light source device and projects the image, wherein the light from the light source unit is sequentially reflected by a concave mirror and a convex mirror and is guided toward the light collection spot in the light guide unit of the light source device.

REFERENCE SIGNS LIST 1, 2, 3, 4, 5 projector
10, 20, 30, 40, 50, 60 light source device
70 light source section
110 light source unit
120, 220, 320 light guide unit
121 concave mirror
122 convex mirror
130 light collection unit
140, 440 fluorescent substance wheel
143 light collection spot
150, 350 spectroscopy unit
323a, 323b divided convex mirror
1000, 2000, 5000 image projection device

The invention claimed is:

1. A projector, comprising:
a light source device; and
an image projection device,
wherein the light source device includes:
at least one light source section configured to emit substantially parallel light in a first wavelength band;
a light guide section configured to guide the substantially parallel light emitted from the at least one light source section toward a light collection spot; and
an adjustment mechanism configured to independently adjust respective positions of at least one convex mirror in three axis directions.

2. The projector according to claim 1, wherein
the light collection spot is on a fluorescent substance, and
the fluorescent substance is configured to emit fluorescent light in response to the substantially parallel light emitted from the at least one light source section.

3. The projector according to claim 1, further comprising:
a reflective-type fluorescent substance wheel with a substrate, wherein
fluorescent substance is on the substrate, and
the reflective-type fluorescent substance wheel is configured to radiate fluorescent light in a same direction as an incident direction of the substantially parallel light emitted from the at least one light source section.

4. The projector according to claim 1, further comprising:
a transmissive-type fluorescent substance wheel with a substrate, wherein
fluorescent substance is on the substrate, and
the transmissive-type fluorescent substance wheel is configured to radiate fluorescent light in a direction opposite to an incident direction of the substantially parallel light emitted from the at least one light source section.

5. The projector according to claim 1, wherein the light guide section comprises at least one concave mirror and the at least one convex mirror.

6. The projector according to claim 5, wherein a reflective surface shape of at least one of the at least one concave mirror and the at least one convex mirror is an aspherical shape.

7. The projector according to claim 5, wherein
a plurality of combinations are provided for the at least one convex mirror, and
each combination of the plurality of combinations includes the at least one light source section and the at least one concave mirror.

8. The projector according to claim 7, wherein the plurality of combinations are provided so as to be symmetric with respect to the at least one convex mirror interposed therebetween.

9. The projector according to claim 5, wherein the substantially parallel light emitted from the at least one light source section is sequentially reflected by the at least one concave mirror and the at least one convex mirror, and is guided toward the light collection spot in the light guide section.

10. The projector according to claim 5, wherein the at least one concave mirror and the at least one convex mirror are arranged such that a central axis of a reflective surface shape of the at least one concave mirror substantially coincides with a central axis of a reflective surface shape of the at least one convex mirror.

11. The projector according to claim 5, further comprising
a plurality of divided convex mirrors with a shape obtained by division of a convex mirror of the at least one convex mirror, wherein
the plurality of divided convex mirrors corresponds to a plurality of respective combinations,
each combination of the plurality of respective combinations includes the at least one light source section and the at least one concave mirror,
the plurality of divided convex mirrors comprises a first divided convex mirror and a second divided convex mirror,
light that is emitted from a first light source section of the at least one light source section and is reflected by a first concave mirror, is reflected by the first divided convex mirror and is guided toward the light collection spot, and
light that is emitted from a second light source section of the at least one light source section and is reflected by a second concave mirror, is reflected by the second divided convex mirror and is guided toward the light collection spot.

12. The projector according to claim 11, wherein a plurality of light collection spots are formed at different positions so as to correspond to the respective plurality of divided convex mirrors.

13. The projector according to claim 1, wherein a position of the light collection spot in a plane perpendicular to light reflected by the at least one convex mirror is dynamically changed by adjustment of a position of the light guide section in the plane during a driving operation of the light source device.

14. The projector according to claim 1, wherein the light collection spot is on a fluorescent substance configured to emit fluorescent light in response to the substantially parallel light emitted from the at least one light source section.

15. The projector according to claim 14, wherein
the light source device further comprises a light source section configured to emit light in a second wavelength band different from that of the fluorescent light, and
the light source device is configured to output light obtained by combining the fluorescent light and the light emitted from the light source section.

* * * * *